(12) United States Patent
Muramoto

(10) Patent No.: US 11,385,850 B2
(45) Date of Patent: Jul. 12, 2022

(54) CONTENT REPRODUCTION DEVICE, PICTURE DATA OUTPUT DEVICE, CONTENT CREATION DEVICE, CONTENT REPRODUCTION METHOD, PICTURE DATA OUTPUT METHOD, AND CONTENT CREATION METHOD

(71) Applicant: Sony Interactive Entertainment Inc., Tokyo (JP)

(72) Inventor: Junichi Muramoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/285,803

(22) PCT Filed: Oct. 26, 2018

(86) PCT No.: PCT/JP2018/039927
§ 371 (c)(1),
(2) Date: Apr. 15, 2021

(87) PCT Pub. No.: WO2020/084778
PCT Pub. Date: Apr. 30, 2020

(65) Prior Publication Data
US 2021/0342109 A1 Nov. 4, 2021

(51) Int. Cl.
*G06F 3/14* (2006.01)
*G06T 7/70* (2017.01)

(52) U.S. Cl.
CPC . *G06F 3/14* (2013.01); *G06T 7/70* (2017.01)

(58) Field of Classification Search
CPC .................................. G06F 3/14; G06T 7/70
See application file for complete search history.

(56) References Cited

U.S. PATENT DOCUMENTS

| 9,836,873 | B2 | 12/2017 | Holzer |
| 9,894,272 | B2 | 2/2018 | Furumura |
| 2014/0293002 | A1 | 10/2014 | Furumura |
| 2015/0130894 | A1 | 5/2015 | Holzer |

(Continued)

FOREIGN PATENT DOCUMENTS

| JP | 2017501516 A | 1/2017 |
| WO | 2013069048 A1 | 5/2013 |

OTHER PUBLICATIONS

International Search Report for corresponding PCT Application No. PCT/JP2018/039927, 4 pages, dated Jan. 15, 2019.

(Continued)

*Primary Examiner* — Samantha (Yuehan) Wang
(74) *Attorney, Agent, or Firm* — Matthew B. Dernier, Esq.

(57) ABSTRACT

Original pictures photographed from a plurality of photograph viewpoints are prepared, display pictures for regions corresponding to visual-lines are generated while switching to an original picture photographed from another viewpoint is being performed according to movement of a subject 81 or the like. The original pictures are associated with tag data indicating the positions of images of particular subjects. When the viewpoint is switched, the visual line is controlled such that the position indicated by a tag for a same subject is included within the visual field before and after the switching. Accordingly, a post-switching region is displayed.

14 Claims, 11 Drawing Sheets

(56) References Cited

U.S. PATENT DOCUMENTS

| | | | | |
|---|---|---|---|---|
| 2017/0142486 A1* | 5/2017 | Masuda | ............. | H04N 21/2343 |
| 2017/0244945 A1* | 8/2017 | Matias | ............... | H04N 5/23293 |
| 2018/0300854 A1* | 10/2018 | Dmitrenko | .............. | G06T 15/04 |
| 2019/0102940 A1* | 4/2019 | Nakao | .................... | H04N 5/232 |

OTHER PUBLICATIONS

Mase, K., et al. "Socially assisted Multi-view Video Viewer" ACM, Proceedings of the 13th International Conference on Multimodal Interfaces, pp. 319-322, Nov. 18, 2011.

International Preliminary Report on Patentability and Written Opinion for corresponding PCT Application No. PCT/JP2018/039927, 31 pages, dated May 6, 2021.

* cited by examiner

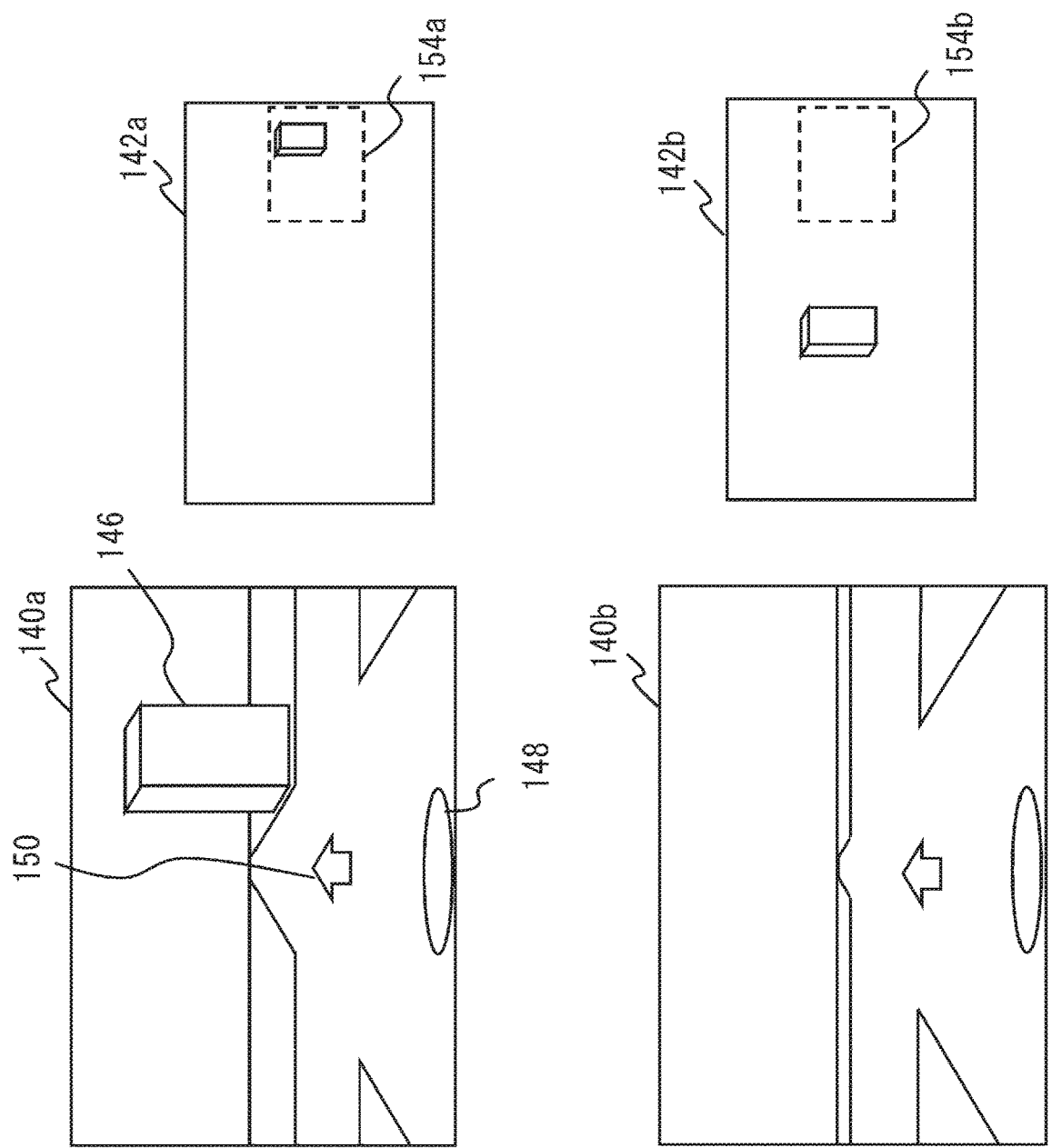
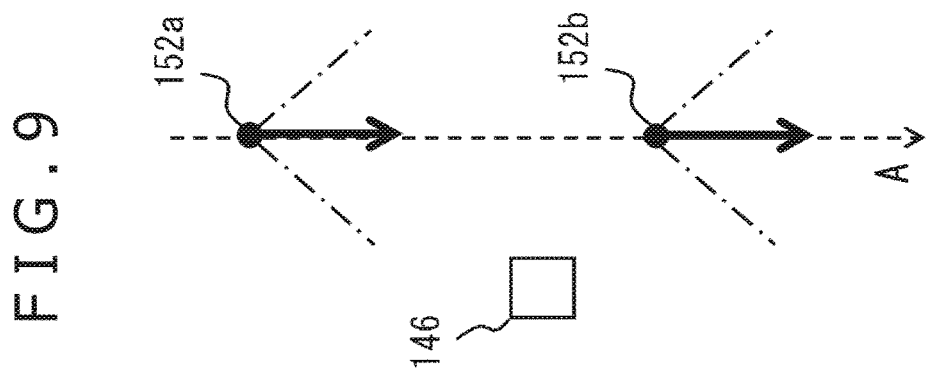
FIG. 9

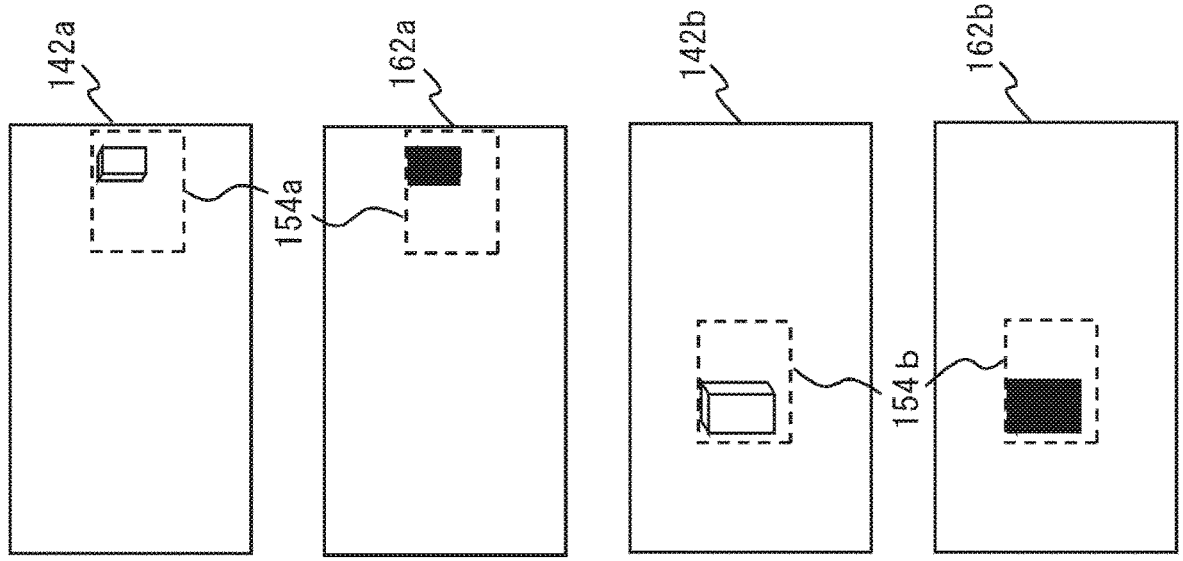
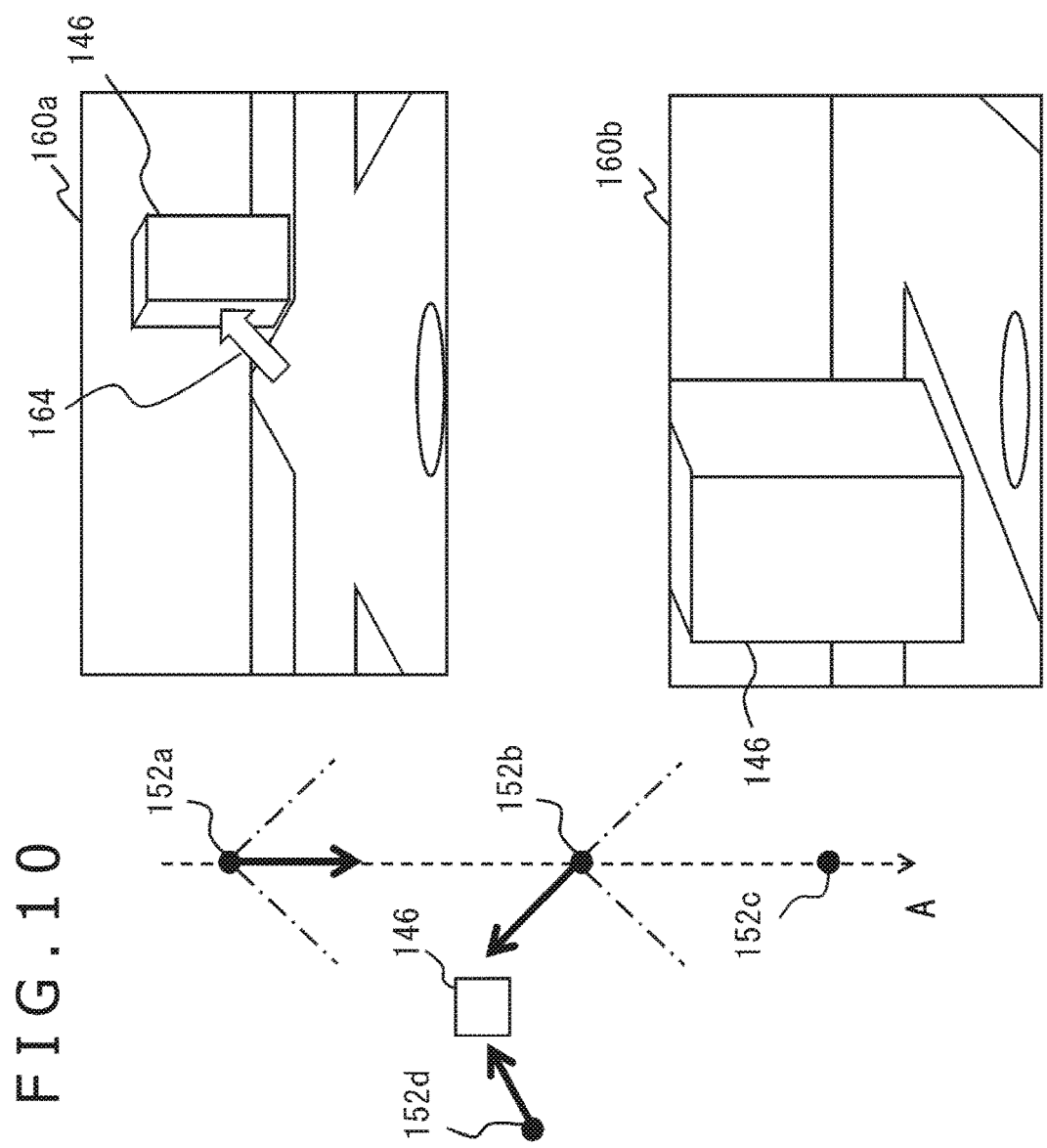
FIG. 10

CONTENT REPRODUCTION DEVICE, PICTURE DATA OUTPUT DEVICE, CONTENT CREATION DEVICE, CONTENT REPRODUCTION METHOD, PICTURE DATA OUTPUT METHOD, AND CONTENT CREATION METHOD

TECHNICAL FIELD

The present invention relates to a content reproduction device that reproduces content involving picture display, a content creation device that creates content, a picture data output device that outputs picture data for use in content, and a content reproduction method, a picture data output method, and a content creation method to be respectively performed by the devices.

BACKGROUND ART

Cameras capable of taking whole-sky pictures or wide-angle pictures extremely close to whole-sky pictures by means of fisheye lenses or the like, are becoming familiar. If a picture taken by such a camera is viewable as a display target from a free viewpoint through a head mounted display or a cursor operation, the picture world can be enjoyed while giving a high immersion feeling, or states in various places can be presented.

[Summary] [Technical Problem]

When an angle of view of a picture for use in display is widened, the picture can be more dynamically displayed, but some inconveniences are caused due to a significant increase in the degree of freedom of a viewpoint or visual line when the display region is defined. For example, in a case where a viewer views a wide angle picture while changing the viewpoint or visual line, a target that the viewer originally wanted to watch or that the viewer watched a while ago may be missed so that a great effort is required to display the target again. In addition, in a case where pictures taken from a plurality of viewpoints are switchingly used for display, if display after the switching is quite different from that before the switching, the viewer may get confused.

The present invention has been made in view of the above problems, and an object thereof is to provide a technology of continuing picture display in a preferable visual field by using a whole-sky picture.

Solution to Problem

One aspect of the present invention relates to a picture data content reproduction device. The content reproduction device includes a data acquisition section that acquires data on an original picture for use in display, and tag data indicating a position of a particular subject in the original picture, a display-viewpoint acquisition section that acquires a display-time viewpoint and a display-time visual line with respect to the original picture, a display-picture generation section that generates, from the original picture, a display picture in a visual field based on the display-time viewpoint and the display-time visual line, and a data output section that outputs data on the display picture to a display device, in which, in a state where a predetermined condition is satisfied, the display-picture generation section changes display on the basis of the position in the original picture indicated by the tag, by referring to the tag data.

Another aspect of the present invention relates to a picture data output device that outputs data on an original picture for use in display. The picture data output device includes an original picture acquisition section that acquires data on the original picture, a tag data generation section that generates tag data indicating the position of a particular subject in the original picture, and a data output section that outputs data on the original picture and the tag data in association with each other.

Still another aspect of the present invention relates to a content creation device. The content creation device includes a data acquisition section that acquires data on a plurality of original pictures photographed from different viewpoints, and data on tags indicating positions of a particular subject in the respective original pictures, a content generation section that generates video data using the original pictures by setting data on an original picture for use in display, a timing of switching the original picture, and a visual field to be displayed, with respect to a time axis of the display, and a data output section that outputs the video data, in which the content generation section controls a post-switching visual field at the timing of switching the original picture such that the position indicated by the tag for a same subject is included within the visual field before and after switching.

Yet another aspect of the present invention relates to a content reproduction method by a content reproduction device. The content reproduction method includes a step of acquiring data on an original picture for use in display, and tag data indicating a position of a particular subject in the original picture, a step of acquiring a display-time viewpoint and a display-time visual line with respect to the original picture, a step of generating, from the original picture, a display picture in a visual field based on the display-time viewpoint and the display-time visual line, and a step of outputting data on the display picture to a display device, in which the step of generating the display picture involves changing the display, in a state where a predetermined condition is satisfied, on the basis of the position in the original picture indicated by the tag, by referring to the tag data.

A further aspect of the present invention relates to a picture data output method by a picture data output device that outputs data on an original picture for use in display. The picture data output method includes a step of acquiring data on the original picture, a step of generating tag data indicating a position of a particular subject in the original picture, and a step of outputting data on the original picture and the tag data in association with each other.

A still further aspect of the present invention relates to a content creation method by a content creation device. The content creation method includes a step of acquiring data on a plurality of original pictures photographed from different viewpoints, and data on tags indicating positions of a particular subject in the respective original pictures, a step of generating video data using the original pictures by setting data on an original picture for use in display, a timing of switching the original picture, and a visual field to be displayed, with respect to a time axis of the display, and a step of outputting the video data, in which the step of generating the video data involves controlling a post-switching visual field at the timing of switching the original picture such that the position indicated by the tag for a same subject is included within the visual field before and after the switching.

It is to be noted that an optional combination of the aforementioned constituent features, and any translation of the present invention to a method, a device, a system, a computer program, a recording medium having a computer program recorded therein, or the like, are also effective as aspects of the present invention.

Advantageous Effect of Invention

According to the present invention, picture display in a preferable visual field can be continued by using a whole-sky picture.

BRIEF DESCRIPTION OF DRAWINGS

FIG. 9 is an explanatory diagram of a method of using tag data for content in which an actual situation in a place on a map is represented by photographed images, according to the present embodiment.

FIG. 10 is an explanatory diagram of a method of using tag data for content in which an actual situation in a place on a map is represented by photographed images, in the present embodiment.

DESCRIPTION OF EMBODIMENT

Figure 1:
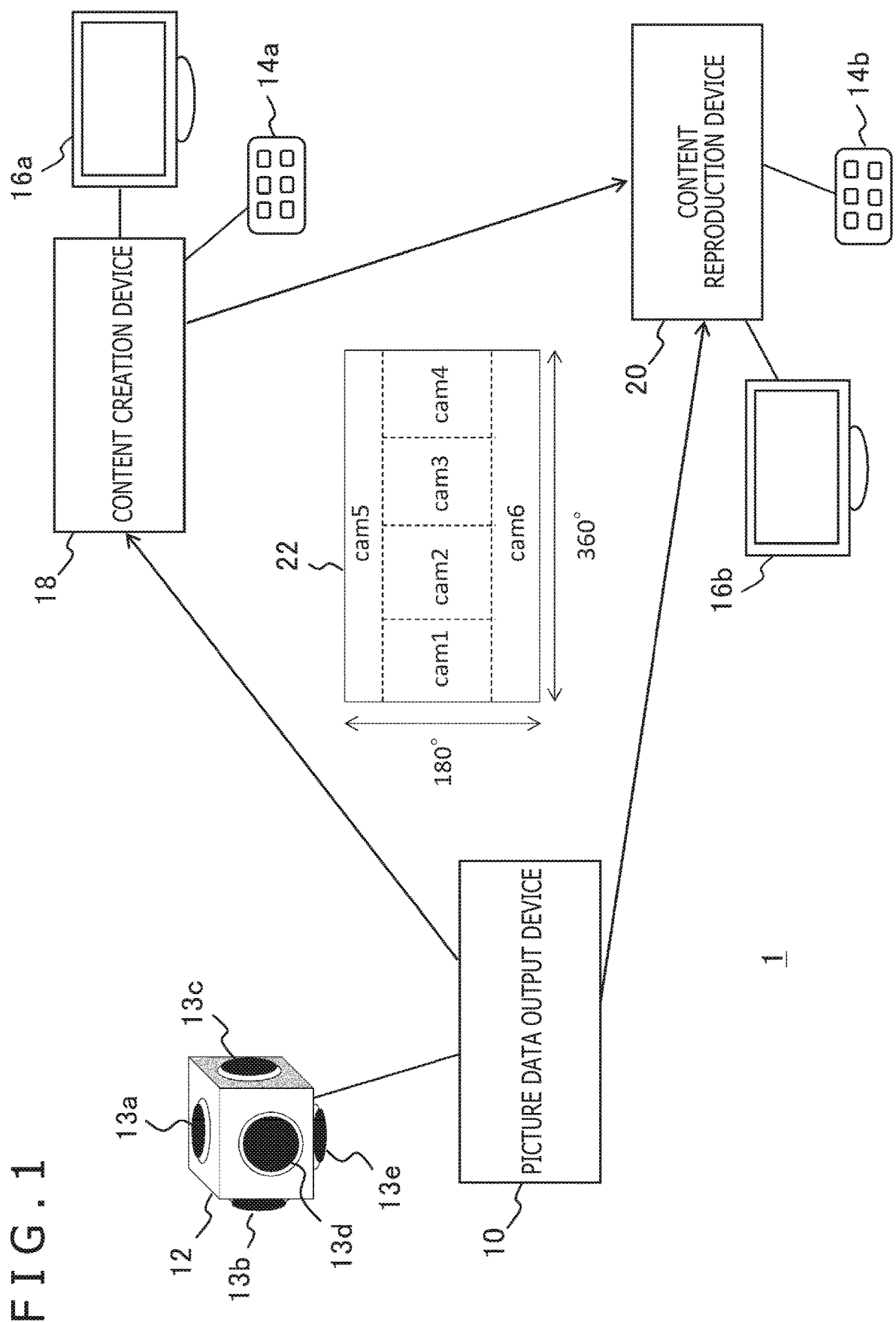
FIG. 1 is a diagram depicting a configuration example of a content processing system to which the present embodiment is applicable.

FIG. 1 depicts a configuration example of a content processing system to which the present embodiment is applicable. A content processing system 1 includes a picture capturing device 12 that photographs a real space, a picture data output device 10 that outputs data on pictures, including a photographed picture, for use in display, a content creation device 18 that generates data on content involving picture display using an outputted picture as an original picture, and a content reproduction device 20 that reproduces content involving picture display using an original picture or content data.

A display device 16a and an input device 14a that are used by a content creator to create content may be connected to the content creation device 18. A display device 16b through which a content viewer views a picture, and an input device 14b through which an operation for the content or for a displayed item is performed may be connected to the content reproduction device 20.

The picture data output device 10, the content creation device 18, and the content reproduction device 20 establish communication thereamong over a wide-area communication network such as the internet or a local network such as a LAN (Local Area Network). Alternatively, data provision from the picture data output device 10 to the content creation device 18 and the content reproduction device 20 and/or data provision from the content creation device 18 to the content reproduction device 20 may be carried out via a recording medium.

The picture data output device 10 and the picture capturing device 12 may be connected via a wired cable or may be wirelessly connected over a wireless LAN or the like. The content creation device 18 may be connected to the display device 16a and the input device 14a by wire or wirelessly, and also, the content reproduction device 20 may be connected to the display device 16b and the input device 14b by wire or wirelessly. Alternatively, two or more of the above devices may be integrally formed. For example, the picture capturing device 12 and the picture data output device 10 may be integrated into a picture capturing device or an electronic device.

The display device 16b, on which a picture reproduced by the content reproduction device 20 is displayed, does not need to be a flat display, and may be a projector or a wearable display such as a head mounted display. The content reproduction device 20, the display device 16b, and the input device 14b may be integrated into a display device or an information processing device. Thus, no restriction is imposed on the outer shapes and connection forms of the depicted devices. In addition, in a case where the content reproduction device 20 directly processes an original picture from the picture data output device 10 and generates a display picture, the content creation device 18 does not need to be included in the system.

The picture capturing device 12 includes a plurality of lenses 13a, 13b, 13c, 13c, 13d, 13e, . . . , and a plurality of cameras respectively including picture capturing sensors such as CMOS (Complementary Metal Oxide Semiconductor) sensors corresponding to the lenses. Each of the cameras takes a picture at an allocated angle of view. The picture capturing device 12 has a mechanism of outputting a two-dimensional luminance distribution of an image formed by light collected by the lenses, as in common cameras. Still pictured may be photographed, or videos may be photographed.

The picture data output device 10 acquires data on photographed pictures outputted from the cameras, and generates one original picture data set by connecting the photographed pictures. The term "original picture" refers to a picture that is an original a portion of which may be displayed or which is displayed after being processed. For example, in a case where a whole-sky picture is prepared, and a portion of the whole-sky picture in a visual field corresponding to the visual line of a viewer is displayed on a screen of a head mounted display, this whole-sky picture is regarded as an original picture. A whole-sky picture will be mainly used in the following explanation. However, original pictures in the present embodiment are not limited to whole-sky pictures.

To obtain a whole-sky picture, the picture capturing device 12 that includes four cameras having respective optical axes at an interval of 90 degrees with respect to a horizontal azimuth, and two cameras having respective optical axes extending vertically upward and downward is installed to photograph pictures each having an equal angle of view which is a sixth part of the full azimuth. Then, in a picture plane such as picture data 22 depicted in FIG. 1 in which the horizontal direction indicates an azimuth of 360° and the vertical direction indicates an azimuth of 180 degrees, photographed pictures are arranged in regions corresponding to the angles of view of the respective cameras, and are connected together. As a result, an original picture is generated. In FIG. 1, pictures photographed by the six cameras are denoted by "cam1" to "cam6," respectively.

The format of the picture data 22 depicted in FIG. 1 is called an equirectangular projection and is generally used for drawing a whole-sky picture on a two-dimensional plane. However, the number of cameras and the data format are not limited to those described above. The angle of view of a picture obtained by the connection is also not limited to a particular angle. In addition, it is general that a joint section between pictures is actually decided in view of the shape of an image in the vicinity of the joint section. Thus, the joint section is not limited to a straight line such as that depicted in FIG. 1. The picture data 22 is compressed and encoded into a common format, and then, is provided to the content creation device 18 via a network or a recording medium.

It is to be noted that, in a case where the picture capturing device 12 photographs a video, the picture data output device 10 sequentially generates and outputs the picture data 22 as an image frame at each time step. The content creation device 18 creates content using the picture data 22. This creation of content may be completely executed by the content creation device 18 on the basis of a prepared program or the like, or at least a portion of the creation may be manually executed by a content creator.

For example, the content creator displays at least a portion of a picture indicated by the picture data 22 on the display device 16a and decides a region to be used for the content or associates the region with a reproduction program or an electronic game, through the input device 14a. Alternatively, the content creator may edit a video indicated by the picture data 22 through a video edition application. Similar processing may be executed by the content creation device 18 itself according to a previously created program or the like.

That is, as long as the picture data 22 is used, no limitation is imposed on the details or purpose of content to be created by the content creation device 18. Data on the content thus created is provided to the content reproduction device 20 via a network or a recording medium. Picture data included in the content may have the same configuration as the picture data 22 or may have a data format and the angle of view that are different from those of the picture data 22. Pictures having undergone a certain processing may also be used.

The content reproduction device 20 displays a picture for the content on the display device 16b by, for example, performing information processing provided as the content, in response to a content viewer's operation on the input device 14b. According to the type of the content, a viewpoint or a visual line with respect to a display picture may be changed in response to a viewer's operation on the input device 14b. Alternatively, such a viewpoint or a visual line may be determined by the content side.

By way of example, the content reproduction device 20 maps, on the inner surface of a celestial sphere centered on a content viewer with a head mounted display, the picture data 22 that is obtained by photographing from the position of the content viewer, and displays, on a screen of the head mounted display, a picture for a region toward which the face of the content viewer is directed. Accordingly, no matter which direction the content viewer faces, the content viewer can see a picture world in a visual field corresponding to the direction. Thus, the content viewer can feel as if the viewer entered the picture world. In this case, a motion sensor included in the head mounted display serves as the input device 14b, and acquires, as input information, a measurement value for deriving which direction the content viewer faces.

Alternatively, a flat display may be used as the display device 16b, and the content viewer moves a cursor displayed on the flat display such that scenery in the direction to which the cursor is moved can be seen. It is to be noted that, when it is not necessary to edit a picture or associate a picture with another information, the content reproduction device 20 may directly acquire the picture data 22 from the picture data output device 10 and may display the entirety or a portion of the picture data 22 on the display device 16b.

Figure 2:
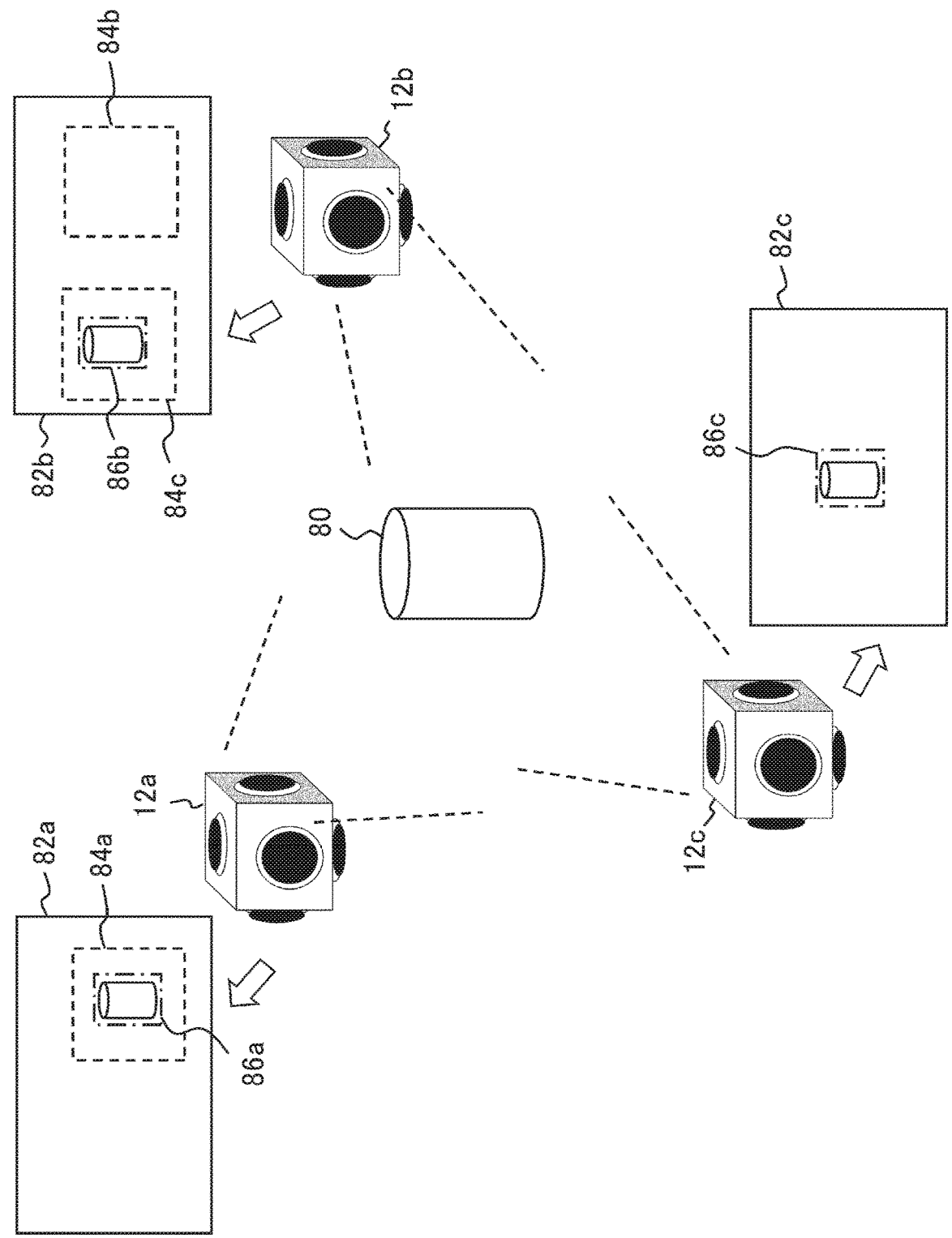
FIG. 2 is a diagram schematically depicting an example of a photograph environment for acquiring an original picture according to the present embodiment.

FIG. 2 schematically depicts an example of a photograph environment for acquiring an original picture according to the present embodiment. In the present embodiment, whole-sky pictures are photographed from a plurality of viewpoints so that a plurality of original pictures from different viewpoints are acquired. For example, a space including a subject 80 is photographed from the viewpoints of picture capturing devices 12a, 12b, and 12c, as illustrated in FIG. 2. It is to be noted that a plurality of the picture capturing devices 12a, 12b, and 12c are not necessarily installed to perform photographing simultaneously. Alternatively, one picture capturing device may be moved to the viewpoints and perform photographing at independent timings. In addition, any limitation is not imposed on the number of the viewpoints. Hereinafter, a viewpoint from which an original picture is photographed is referred to as "photograph viewpoint."

In the aforementioned manner, original pictures photographed from different photograph viewpoints are prepared to allow a content creator to switch the composition of a video, or to switch an original picture for use in display according to a viewpoint or visual line desired by a viewer. For example, it is common to, in the process of reproducing a video such as a movie, perform switching to a picture of the same space at a different angle such that the expression becomes effective or the facial expression of a player becomes clearer.

However, in a case where content such as a video is created by using previously photographed whole-sky pictures, as in the present embodiment, when a photograph viewpoint or an original picture for use is switched, setting of the visual field before and after the switching is difficult. In the example in FIG. 2, the azimuth in which the subject 80 is present varies with respect to the viewpoints of the picture capturing devices 12a, 12b, and 12c. Thus, in picture data 82a, 82b, and 82c which are equirectangular projections obtained from the respective visual points, the position of an image of the subject 80 naturally varies.

To perform display switch from a state in which a picture having a visual field of a region 84a is represented by use of the picture data 82a, to a state in which a picture using the picture data 82b is displayed, for example, the most simple way may be displaying a region 84b the range of which is unchanged irresepective of the visual point (the azimuth of which is the same with respect to the visual point). However, in a case where a viewer is watching an image of the subject

80 before switching, the image of the subject 80 is not included in the region 84bb which is displayed after the switching. Accordingly, confusion can be caused so that the visual line is not settled.

A content creator who creates the video may set original picture switching, and also set the visual field to display pictures with continuity. However, much labor is required to find a proper visual field from a wide-angle picture such as a whole-sky picture. In addition, the intervention of the content creator is indispensable. Not only in a case of previously performing switching for a video, but also in a case of switching original pictures according to a viewer's operation, a viewer may lose a target which the viewer desires to see and need to find out the target from a wide angle of view. This gives a big stress to the viewer.

To this end, the picture data output device 10 according to the present embodiment provides not only original pictures from a plurality of photograph viewpoints, but also data on tags indicating positions of a particular subject in the planes of the respective original pictures. For example, in the planes of the picture data 82a, 82b, and 82c, tags are respectively provided to regions 86a, 86b, and 86c. Then, the visual line is controlled such that, in a case where any one of the tagged regions is included in the displayed visual field immediately before original picture switching, the tagged region is still included in the visual field of the switched original picture.

In the example depicted in FIG. 2, since the tagged region 86a is included in the region 84a of the picture data 82a which is displayed before switching, a region 84c including the tagged region 86b in the switched picture data 82b is displayed. In a case where there is a plurality of particular subjects, identification information for identifying each subject is further included in a tag. Thus, the same subject is displayed before and after switching. It is to be noted that a particular subject refers to a subject that is detected in accordance with a predetermined rule, or a subject that is selected by a person. In this manner, a displayed subject can be inherited, irrespective of switching of original pictures for use in display. As a result, while the range of picture expression is widened or a providable information amount is increased by means of a multi-viewpoint whole-sky picture, dissipated presentation can be easily avoided. Thus, the visibility and convenience can be enhanced.

Figure 3:
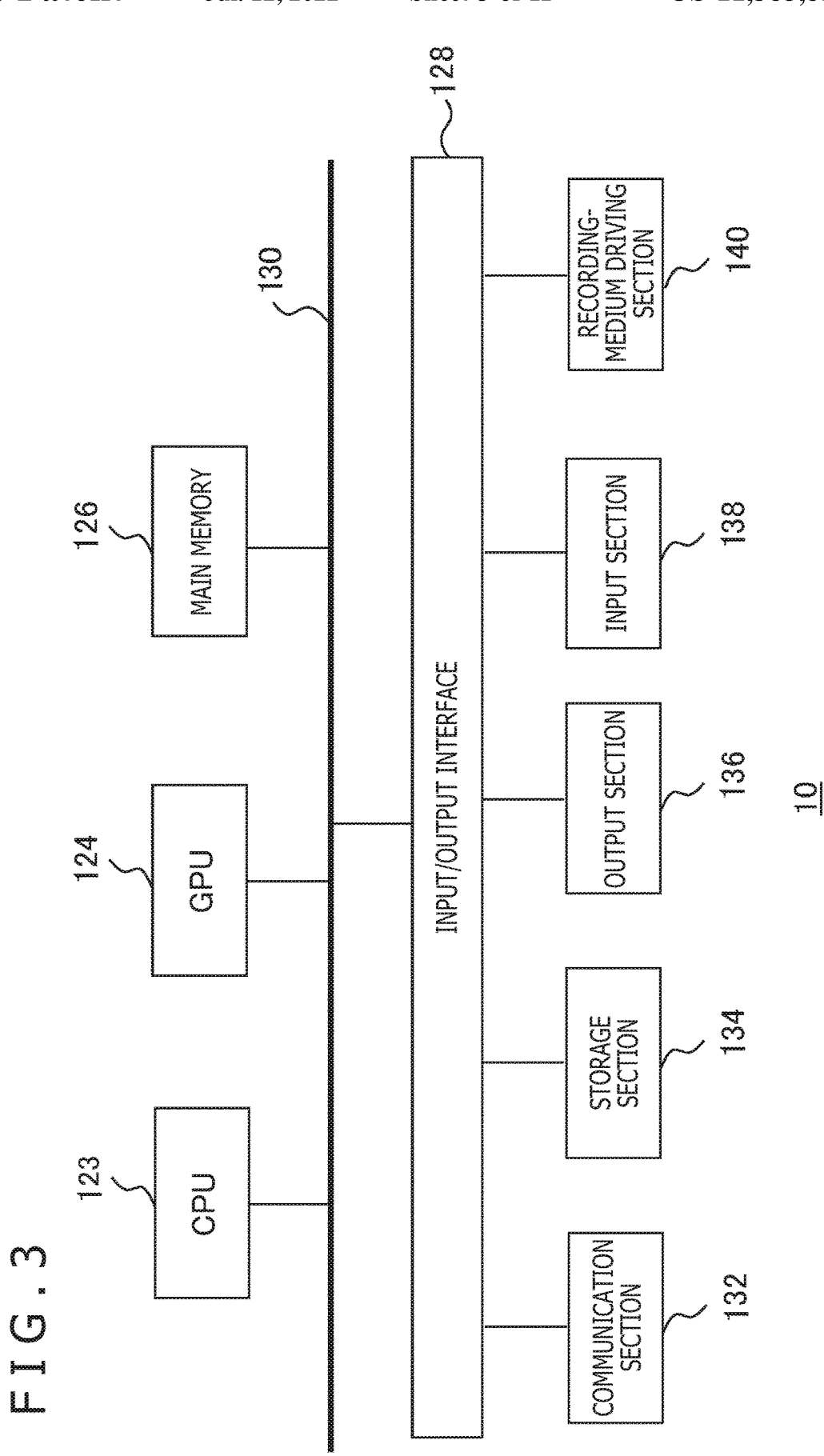
FIG. 3 is a diagram depicting an inner circuit configuration of a picture data output device according to the present embodiment.

FIG. 3 depicts an inner circuit configuration of the picture data output device 10. The picture data output device 10 includes a CPU (Central Processing Unit) 23, a GPU (Graphics Processing Unit) 124, and a main memory 26. These components are mutually connected via a bus 30. An input/output interface 28 is also connected to the bus 30. A communication section 32 that is including a peripheral device interface such as a USB (Universal Serial Bus) or IEEE1394 or of a network interface for a wired or wireless LAN, a storage section 34 that is a hard disk drive, a nonvolatile memory, or the like, an output section 36 that outputs data to an external device, an input section 38 that receives data from an external device such as the picture capturing device 12, and a recording-medium driving section 40 that drives a removable recording medium such as a magnetic disc, an optical disk, or a semiconductor memory, are connected to the input/output interface 28.

The CPU 23 controls the entirety of the picture data output device 10 by executing the operating system stored in the storage section 34. The CPU 23 further executes various programs that are read out from a removable recording medium and are loaded into the main memory 26, or that are downloaded via the communication section 32. The GPU 24 has a function as a geometry engine and a function as a rendering processor, and performs a rendering in accordance with a rendering command from the CPU 23, and gives an output to the output section 36. The main memory 26 includes a RAM (Random Access Memory) and stores a program or data necessary for processing. It is to be noted that each of the content creation device 18 and the content reproduction device 20 may also have the similar inner circuit configuration.

Figure 4:
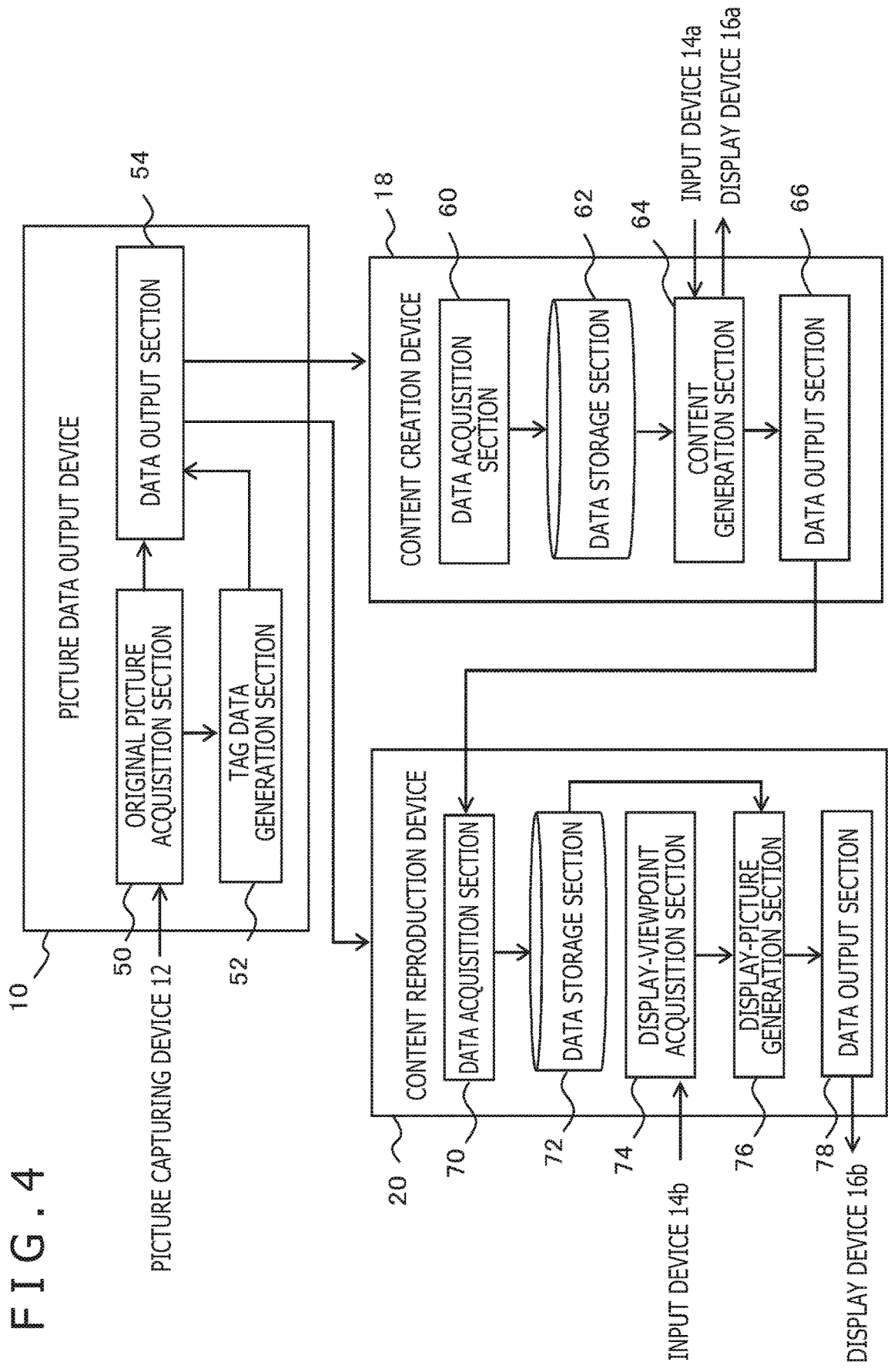
FIG. 4 is a diagram depicting a functional block configuration of a picture data output device, a content generation device, and a content reproduction device according to the present embodiment.

FIG. 4 depicts a functional block configuration of the picture data output device 10, the content creation device 18, and the content reproduction device 20. The functional blocks depicted in FIG. 4 can be implemented by the circuits depicted in FIG. 3 in terms of hardware, and can be implemented by a program loaded from a recording medium to a main memory so as to exhibit various functions including an image analysis function, an information processing function, an image rendering function, and a data input/output function, in terms of software. Therefore, it should be understood by a person skilled in the art that these functional blocks can be implemented in various forms, that is, by hardware only, software only, or a combination thereof. No limitation is imposed on this combination.

The picture data output device 10 includes an original picture acquisition section 50 that acquires data on a plurality of original pictures, a tag data generation section 52 that generates data on tags corresponding to the original pictures, and a data output section 54 that outputs data on the original pictures and the corresponding tags, and positional information regarding the photograph viewpoints. The original picture acquisition section 50 is implemented by the input section 38, the CPU 23, the GPU 24, the main memory 26 in FIG. 3, and the like, and acquires data on pictures photographed from a plurality of viewpoints by the picture capturing device 12, and information regarding the positions where the pictures have been photographed.

In a case where the picture capturing device 12 photographs pictures by dividing the angle of view, as depicted in FIG. 1, the original picture acquisition section 50 acquires the photographed pictures, connects the pictures together, and generates, as an original picture, one whole-sky picture. In a case where the pictures already have been connected together at the picture capturing device 12, the original picture acquisition section 50 may directly use, as an original picture, the photographed picture acquired from the picture capturing device 12. It is to be noted that the original picture acquisition section 50 may acquire data on a whole-sky picture that is rendered by computer graphics, instead of a photographed picture.

A photographed picture is used in the following explanation, but this explanation can also be applied to a picture obtained by computer graphics. The original picture acquisition section 50 supplies, to the data output section 54, data on the acquired original pictures and data indicating a positional relation among the viewpoints where the pictures have been photographed. Further, the data on the original pictures is also supplied to the tag data generation section 52.

The tag data generation section 52 is implemented by the CPU 23, the GPU 24, the main memory 26 in FIG. 3, and the like, and detects a subject image from the original picture by a predetermined algorithm, and generates tag data indicating the position of the subject image in the picture plane. Various technologies for detecting a specific subject image from a picture have been put into actual use. The present embodiment can adopt any one of these technologies. Examples of the technologies include matching using a template subject image, and face detection using a feature amount of an average face. In a case where the subject is moving, a feature-point following technology using an optical flow or the like can be adopted. Further, through deep learning, a subject may be surmised from the shape or color of the subject image.

The tag data generation section 52 derives, as an "image position" to be tagged, information regarding the position coordinates of a representative point of a detected image or about a predetermined range region including the image in the plane of each original picture (e.g. the plane of an equirectangular projection). The representative point refers to a point that is included in an image and that is determined in accordance with a predetermined rule, and the point is the gravity center of the image, an upper left point, or the like. The predetermined range region including the image refers to the region of the image itself, the circumscribed rectangle of the image, a predetermined size rectangle including the image, or the like. Information regarding the region may be map data in which variation of pixel values is indicated in a picture plane, or may be data indicating the position and size of the region by numerical values, such as the coordinates of the upper left position of the circumscribed rectangle and two adjacent sides of the circumscribed rectangle.

In a case where the above image detection processing indicates that a plurality of particular subjects are included, the tag data generation section 52 generates tag data by associating the positions of images with identification information regarding the corresponding subjects. A subject to be tagged may be selectable from among various subjects included in the picture. For example, the tag data generation section 52 may display, on a display device (not depicted), an original picture in which the images of detected subjects are enclosed with geometrical figures to allow a user to select a target to be tagged.

Alternatively, the original picture may be displayed as it is such that a user is allowed to initially designate a subject to be tagged. In this case, the tag data generation section 52 can omit a process of detecting subject images. In a case where the original picture is a video, information in the tag changes with movement of a subject, as a matter of course. Therefore, the tag data generation section 52 generates tag data for each frame of the original picture.

The data output section 54 is implemented by the CPU 23, the main memory 26, the communication section 32 in FIG. 3, and the like, and outputs a plurality of original pictures, data on the corresponding tags, and data on positional information regarding the viewpoints to the content creation device 18 or the content reproduction device 20. Alternatively, the data output section 54 may include the recording-medium driving section 40 to store the above data in a recording medium. It is to be noted that, in a case where the picture data is a video, the data output section 54 outputs each frame constituting the video and tag data in association with each other. In addition, the picture data is compressed and encoded, as appropriate, before being outputted.

The content creation device 18 includes a data acquisition section 60 that acquires data on a plurality of original pictures and the corresponding tags, and data on positional information regarding viewpoints, a data storage section 62 that stores the above data, a content generation section 64 that generates content using data on the original pictures, and a data output section 66 that outputs data on the content. The data acquisition section 60 is implemented by the communication section 32, the CPU 23, the main memory 26 in FIG. 3, and the like, and acquires various data outputted from the picture data output device 10. Alternatively, the data acquisition section 60 may include the recording-medium driving section 40 to read out the above data from a recording medium, as previously explained.

The data acquisition section 60 decodes and decompresses the acquired data, as appropriate, and stores the decoded and decompressed data in the data storage section 62. The data storage section 62 is implemented by the main memory 26 in FIG. 3, and the like, and stores data on a plurality of original pictures taken from different photograph viewpoints and tags corresponding to the original pictures, and data on positional information regarding the photograph viewpoints. The content generation section 64 is implemented by the CPU 23, the GPU 24, the main memory 26 in FIG. 3, and the like, and generates data on content involving picture display by using the data stored in the data storage section 62.

Content to be created is an electronic game, a video for appreciation, or an electronic map, for example. No limitation is imposed on the genre and purpose of the content. A picture to be included in the content may be the whole original picture data or may be a portion thereof. Information for defining a way to select and display the picture may be automatically created by the content generation section 64, or may be at least partially, manually created by a content creator. In the latter case, the content generation section 64 further includes an output section 36 and an input section 38, and displays a picture on the display device 16a, and then, receives a request to edit the picture or generate various information, from the content creator via the input device 14a.

In any case, the content generation section 64 generates data on the content for implementing either one of the following two display modes.

(1) A video in which original pictures and visual fields thereof that are previously defined are used.

(2) A picture in which original pictures and visual fields thereof that are changed according to a content viewer's operation are used.

In the case of (1), the content generation section 64 sets data on an original picture for use in display and a timing of switching the original picture with respect to a time axis of the display. Furthermore, the content generation section 64 sets a temporal change of a visual field to be displayed in the original picture. For example, in the subject field depicted in FIG. 2, the content generation section 64 determines the subject 80 to be displayed or an angle thereof. A photograph viewpoint that enables the desired display is selected on the basis of positional information regarding photograph viewpoints stored in the data storage section 62. Accordingly, setting is performed such that an original picture corresponding to the selected photograph viewpoint is used in display.

Furthermore, among the original pictures, an original picture having a proper visual field is determined. In a case where an original picture that is optimum for use in display is shifted due to movement of a subject, the content generation section 64 determines a timing of switching the original picture. Here, the content generation section 64 controls a post-switching visual line or visual field such that a position provided with a tag for the same subject is included in the visual field before and after the switching. Accordingly, video content in which the continuity of a displayed subject is maintained even after an original picture is switched, can be easily generated. In addition, the display angle of the same subject is changed through the original picture switching so that an effect of expression is exhibited.

In the case of (2), the content generation section 64 generates, on the basis of what is instructed by a content viewer's operation, data indicating a rule for deriving an original picture to be displayed and a visual field thereof. Here, the content viewer's operation is not limited to operations for directly operating viewpoints and visual lines, and may be an indirect operation, such as any command for an electronic game, that leads to a viewpoint change or a visual line change. That is, this rule may be a program for an electronic game. In the above cases, the content generation section 64 generates, as the content data, data indicating the above rule, data on a plurality of original pictures and tags corresponding to the original pictures, and positional information regarding the photograph viewpoints.

Depending on the display purpose, the content generation section 64 may generate new tag data for each original picture. For example, only tag data that is necessary for the purpose, among the tags generated by the picture data output device 10, may be left, or new tag data may be generated again from an original picture. In this case, the content generation section 64 may automatically provide a tag in accordance with a predetermined rule, or a content creator may manually at least a portion of this processing, as in the tag data generation section 52 of the picture data output device 10.

Further, the content generation section 64 may process an original picture or select a necessary original picture. The data output section 66 is implemented by the CPU 23, the main memory 26, the communication section 32 in FIG. 3, and the like, and compresses and encodes the content data generated by the content generation section 64, as appropriate, and outputs the data to the content reproduction device 20. Alternatively, the data output section 66 may include the recording-medium driving section 40 to store the content data in a recording medium.

The content reproduction device 20 includes a data acquisition section 70 that acquires various data from the picture data output device 10 or the content creation device 18, a data storage section 72 that stores the acquired data, a display-viewpoint acquisition section 74 that acquires a display-time viewpoint and a display-time visual line according to a content viewer's operation, a display-picture generation section 76 that generates a picture corresponding to the viewpoint and the visual line, and a data output section 78 that outputs data on a display picture. The data acquisition section 70 is implemented by the communication section 32, the CPU 23, the main memory 26, etc. in FIG. 3, and acquires data on a plurality of original pictures and tags corresponding to the original pictures, and data on positional information regarding the photograph viewpoints, outputted from the picture data output device 10, or acquires content data outputted from the content creation device 18. Alternatively, the data acquisition section 70 may include the recording-medium driving section 40 to read the above data from a recording medium.

The data acquisition section 70 decodes and decompresses the acquired data, as appropriate, and stores the data in the data storage section 72. The data storage section 72 is implemented by the main memory 26, etc. in FIG. 3, and stores data on the plurality of original pictures and the corresponding tags, and data on positional information regarding the photograph viewpoints, or stores the content data. The display-viewpoint acquisition section 74 is implemented by the CPU 23, the GPU 24, the input section 38, etc. in FIG. 3, and acquires a visual point or visual line corresponding to a content viewer's operation via the input device 14b.

For example, display of a GUI (Graphical User Interface) such as a cursor for operating the position of a viewpoint or the direction of a visual line is superimposed on a picture being displayed such that the visual point and the visual line are changed according to an operation performed on the GUI. Alternatively, a game is advanced in response to an input of a command for an electronic game, and a viewpoint and a visual line are decided according to the command. It is to be noted that, in a case where a video created by the content creation device 18 is displayed, the function of the display-viewpoint acquisition section 74 can be omitted if a content viewer does not need to operate the viewpoint and the visual line.

The display-picture generation section 76 is implemented by the CPU 23, the GPU 24, the main memory 26 in FIG. 3, and the like, and generates a picture to be displayed on the display device 16b by using data stored in the data storage section 72. In a case where a video created by the content creation device 18 is displayed, picture frames obtained by decoding and decompression may be directly outputted. In a case where a content viewer is allowed to operate the viewpoint and the visual line, the display-picture generation section 76 decides an original picture for use in display and a region to display the original picture, according to the viewpoint and visual line acquired by the display-viewpoint acquisition section 74.

That is, the display-picture generation section 76 selects an original picture photographed from a photograph viewpoint that corresponds to the display-time viewpoint, by referring to the positional information regarding photograph viewpoints stored in the data storage section 72, and further, decides a region to display the original picture. In a case where the display-time viewpoint or the subject is movable, the display-picture generation section 76 selects the corresponding photograph viewpoint and switches an original picture for use. Then, in a state where a predetermined condition is satisfied, the display is changed on the basis of the position provided with the tag, by referring to the tag data. Specifically, as previously explained, when original picture switching is performed, a visual line with respect to a switched original picture is controlled such that a position provided with a tag for the same subject is included in the visual field before and after the switching.

Alternatively, as explained later, when predetermined input means is operated by a content viewer, the visual line is controlled such that a position provided with a tag is included in the visual field. Then, at each time step, a picture corresponding to the decided visual field is generated as a display picture. It is to be noted that, in a state where a predetermined condition is satisfied as explained above, the display-picture generation section 76 may display a geometrical figure indicating the relative direction of a tagged position, instead of directing the visual line toward the tagged position. The data output section 78 is implemented by the CPU 23, the main memory 26, the output section 36, etc. in FIG. 2, and outputs data on the display picture generated in the aforementioned manner to the display device 16b. The data output section 78 may output sound data, if needed, in addition to data on the display picture.

Figure 5:
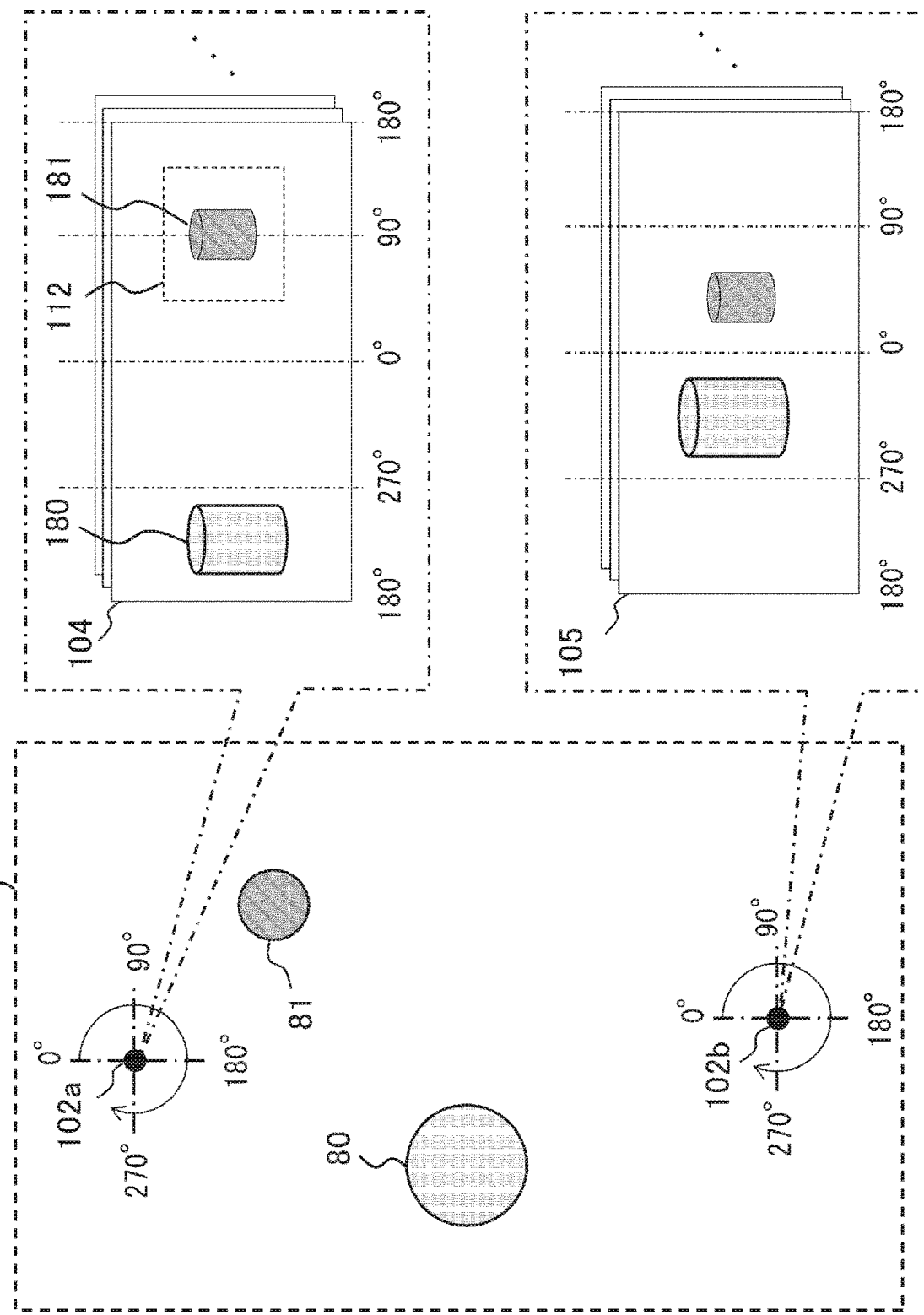
FIG. 5 is a diagram illustrating a relation between an original picture and a space that includes photograph viewpoints and subjects according to the present embodiment.

FIG. 5 illustrates a relation between an original picture and a space including photograph viewpoints and subjects. The left side in FIG. 5 depicts a state where a space including subjects 80 and 81 is seen from a bird's-eye view. Data indicating a positional relation between photograph viewpoints 102a and 102b in this space is photograph-viewpoint positional information 100. It is to be noted that the photograph-viewpoint positional information 100 actually indicates the position coordinates of the photograph viewpoints 102a and 102b in a two-dimensional or three-dimensional space. If videos are respectively photographed from the photograph viewpoints 102a and 102b, the picture data output device 10 associates with data on time-series original pictures 104 and 105 representing picture frames of the videos, with the positional information 100 regarding the photograph viewpoints 102a and 102b, and outputs the data, as depicted on the right side in FIG. 5.

An azimuth is previously defined for each of the photograph viewpoints 102a and 102b. In the example depicted in FIG. 5, the upper side is defined as 0°, and the azimuth (longitude) in the horizontal direction is defined so as to have an angle that increases in the clockwise direction. The azimuth (latitude) in the vertical direction is defined so as to have an angle the range of which is −90° to 90° with respect to the horizon which is defined as 0°. In the original pictures 104 and 105, images (e.g., images 180, 181) of the subjects 80 and 81 respectively observed from the respective photograph viewpoints 102a and 102b are displayed at positions corresponding to the azimuths. In the example depicted in FIG. 5, the center in the lateral direction in each of the original pictures 104 and 105 is defined as a longitude of 0°, and an image in an azimuth from the center to the right direction by 180°, and an image in an azimuth of 180° to 360° (=0°), which extends from the left end of the picture to the center are displayed, whereby a full surround picture is obtained.

However, the definitions of the azimuths and the expression in an original picture are not limited to those in FIG. 5. When a picture is displayed at the content reproduction device 20, the direction of the visual line is decided with the photograph viewpoint 102a set, as appropriate, for example, so that a region 112 corresponding to the direction in the original picture 104 is displayed. In this example, a picture mainly including the image 181 of the subject 81 is displayed. This display mode, in which the direction of a visual line is changeable, is regarded as 3DOF (3 Degrees of Freedom). However, elements (subjects) constituting a photographed scene are stereophonically reproduced by use of a technology such as SfM (Structure from Motion) or camera mapping, a display-time viewpoint can be freely moved.

That is, 6DOF (6 Degrees of Freedom) reproduction in which a display picture is generated with a viewpoint set at a position different from a photograph viewpoint, can be performed. Accordingly, a process of original picture switching to a different photograph viewpoint, which will be explained later, can be performed, even according to movement of a display viewpoint which is controlled independently of a photograph viewpoint. In this case, a rule to select a photograph viewpoint that is closest to a display viewpoint, for example, is introduced.

Figure 6:
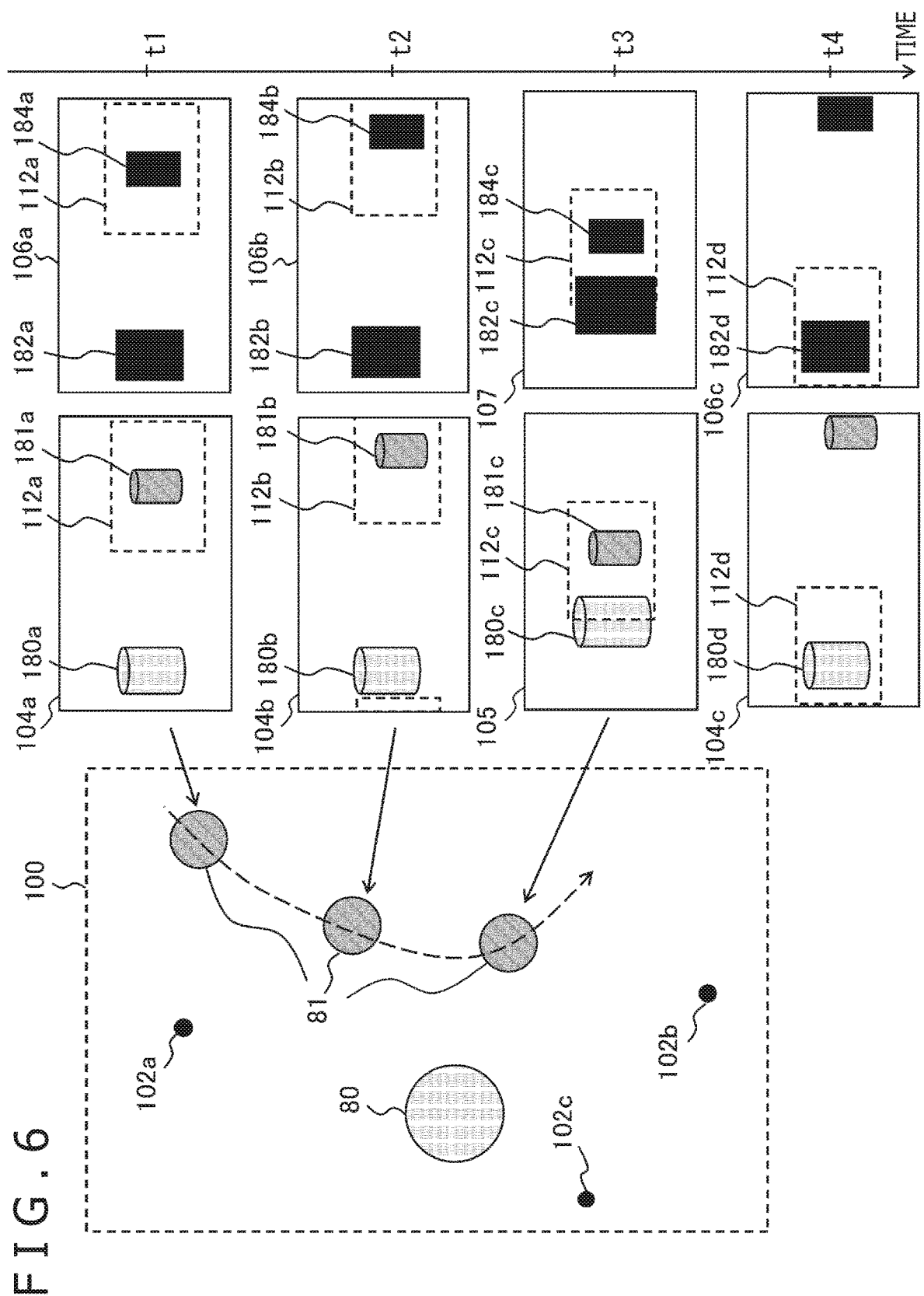
FIG. 6 is a diagram schematically depicting an example of a method of generating a display picture by using data on a plurality of original pictures, data on the corresponding tags, and positional information regarding the corresponding photograph viewpoints, according to the present embodiment.

FIG. 6 schematically depicts an example of a method for generating a display picture by using data on a plurality of original pictures and tags corresponding to the original pictures, and positional information regarding the photograph viewpoints. In this example, it is assumed that the subject 80 is standing still while the subject 81 is moving along a track indicated by a dotted arrow, as depicted in a bird's eye view on the left side. The center in FIG. 6 depicts that some frames of videos photographed from the photograph viewpoints 102a and 102b are displayed as original pictures 104a, 104b, 105, and 104c. Specifically, the original pictures 104a, 104b, and 104c are photographed from the photograph viewpoint 102a at times t1, t2, and t4 in a time axis, which is depicted on the right side of FIG. 6, and the original picture 105 is photographed from the photograph viewpoint 102b at time t3.

Since the subject 80 is standing still, images 180a, 180b, and 180d of the subject 80 in the original pictures 104a, 104b, and 104c, which are photographed from the same photograph viewpoint 102a, are displayed at the same position. Since the subject 81 is moving, images 181a, 181b, etc. of the subject 81 are moving in the planes of the original pictures 104a, 104b, etc., which are photographed from the same photograph viewpoint 102a through. In the original picture 105 photographed from the different photograph viewpoint 102b, images 180c and 181c of both the subjects 80 and 81 are displayed at different positions.

The tag data generation section 52 of the picture data output device 10 generates tag data for each video frame photographed from the photograph viewpoints. For example, tag data 106a, 106b, 107, and 106c are generated for the original pictures 104a, 104b, 105, and 104c, respectively. The tag data 106a, 106b, 107, and 106c in FIG. 6 are map data obtained by giving different pixel values to circumscribed rectangles of the regions of the images of the subjects 80 and 81 in the respective image planes of the corresponding original pictures 104a, 104b, 105, and 104c.

For example, in the original pictures 104a, 104b, and 105, circumscribed rectangles 182a, 182b, 182c, 184a, 184b, and 184c of the images 180a, 180b, 180c, 181a, 181b, and 181c are colored black, and the remaining regions are colored white. However, the format of tag data is not limited to this example, as explained above, and the position coordinates of the gravity centers of the regions of the images of the subjects 80 and 81 may be adopted. In addition, in a case where there are a plurality of subjects to be tagged, as depicted in FIG. 6, identification information for identifying each subject is associated with the corresponding tag.

In a case where the subject 81 is a main display target, the subject 81 is located close to the photograph viewpoint 102a at time t1. Therefore, the original picture 104a photographed from the photograph viewpoint 102a is selected, and a picture of the region 112a including the image 181a of the subject 81 in the original picture 104a is displayed. Since the subject 81 is still located close to the photograph viewpoint 102a at time t2, the original picture 104b photographed from the photograph viewpoint 102a is selected, and a picture of the region 112a including the image 181b of the subject 81 in the original picture 104b is displayed. In these stages, the visual line is decided in accordance with a predetermined rule in the content creation device 18 or the content reproduction device 20, or is decided by a content creator or a content viewer.

In a case where the viewpoint is changed to the photograph viewpoint 102b, which is closest at time t3, due to movement of the subject 81, the original picture for use in display is switched to the original picture 105 photographed from the photograph viewpoint 102b. Here, the content generation section 64 of the content creation device 18 or the display-picture generation section 76 of the content reproduction device 20 confirms whether or not a tagged position is included in the region 112b which has been displayed before the switching, by referring to the tag data 106b corresponding to the original picture 104b before the switching.

In a case where a tagged position is included, a position provided with a tag for the same subject is acquired by referring to the tag data 107 that corresponds to the original picture 105 after the switching. In the example depicted in FIG. 6, the position of the tag 184c for the same subject as the tag 184*b* which is included in the region 112*b* displayed before the switching is acquired. Then, the region 112*c* including this position is decided as a target to be displayed after the original picture switching. This process is performed to adjust the visual line from a post-switching viewpoint such that the subject 81 is included in the visual field. In response to the subsequent movement of the subject 81, the visual field may be set according to the set visual line. It is to be noted that, basically in this example, an original picture is switched in the aforementioned manner at a time point when the closest photograph viewpoint is shifted according to movement of the subject 81, whereby the visual field is properly controlled.

On the other hand, particularly in a case where video content is created, a viewpoint may be jumped to a remote position (e.g. photograph viewpoint 102*c*) such that display from a greatly changed angle is implemented to produce an effect of expression. Also, in this case, a tagged position is included in the visual field when an original picture is switched so that the continuity of the display is maintained. Further, this saves a content creator from having to find out a proper visual field.

Further, in the example depicted in FIG. 6, when the region 112*c* in the original picture 105 is displayed, the image 180*c* of the subject 80 appears at the left end of the picture. In this case, through the appearance of the image, an attention is attracted to improve the saliency. Accordingly, an effect of motivating a viewer to watch the subject 80 from the opposite direction is expected. Therefore, the photograph viewpoint for an original picture for use in display can be intentionally switched by the viewer operating any input means of the input device 14*b*. For example, when the viewpoint is returned from the photograph viewpoint 102*b* to the photograph viewpoint 102*a*, the picture for use in display is switched from the original picture 105 to the original picture 104*c*, as depicted in the transition from time t3 to t4.

In this case, the display-viewpoint acquisition section 74 also receives, from the viewer, an operation of switching the target subject from the subject 81 to the subject 80. Specifically, the image 180*c* of the subject 80 is made selectable in a state where the region 112*c* is being displayed. Accordingly, the display-picture generation section 76 decides a region 112*d* to be displayed so as to include the position of a tag 182*d* for the subject 80, by referring to the tag data 106*c* corresponding to the switched original picture 104*c*.

As a result, an image 180*d* of the subject 80, which has attracted a new attention, viewed from a different angle is displayed. It is to be noted that there are various methods for deciding which one of the tags for a plurality of the subjects is considered to be effective. For example, buttons provided on the input device 14*b* may be allocated to respective subjects, and a tag for a subject corresponding to a pressed button may become effective. Alternatively, a tag for a subject that is displayed at the screen center immediately before viewpoint switching may become effective.

In a case where any tagged position is not included in the visual field before the viewpoint switching, the visual line may be decided to the same azimuth, when viewed from the photograph viewpoint before and after the switching, for example, and a picture having the corresponding visual field may be displayed. Alternatively, the visual line may be decided toward the same azimuth in the space, and a picture having the corresponding visual field may be displayed. In an embodiment in which a content viewer operates the viewpoint and the visual line, when original picture data is switched, not a region, such as the region 112*c*, including a tagged position is directly displayed, but auxiliary data indicating a direction in which a subject image is present may be displayed so that the image is displayed according to a content viewer's operation.

Figure 7:
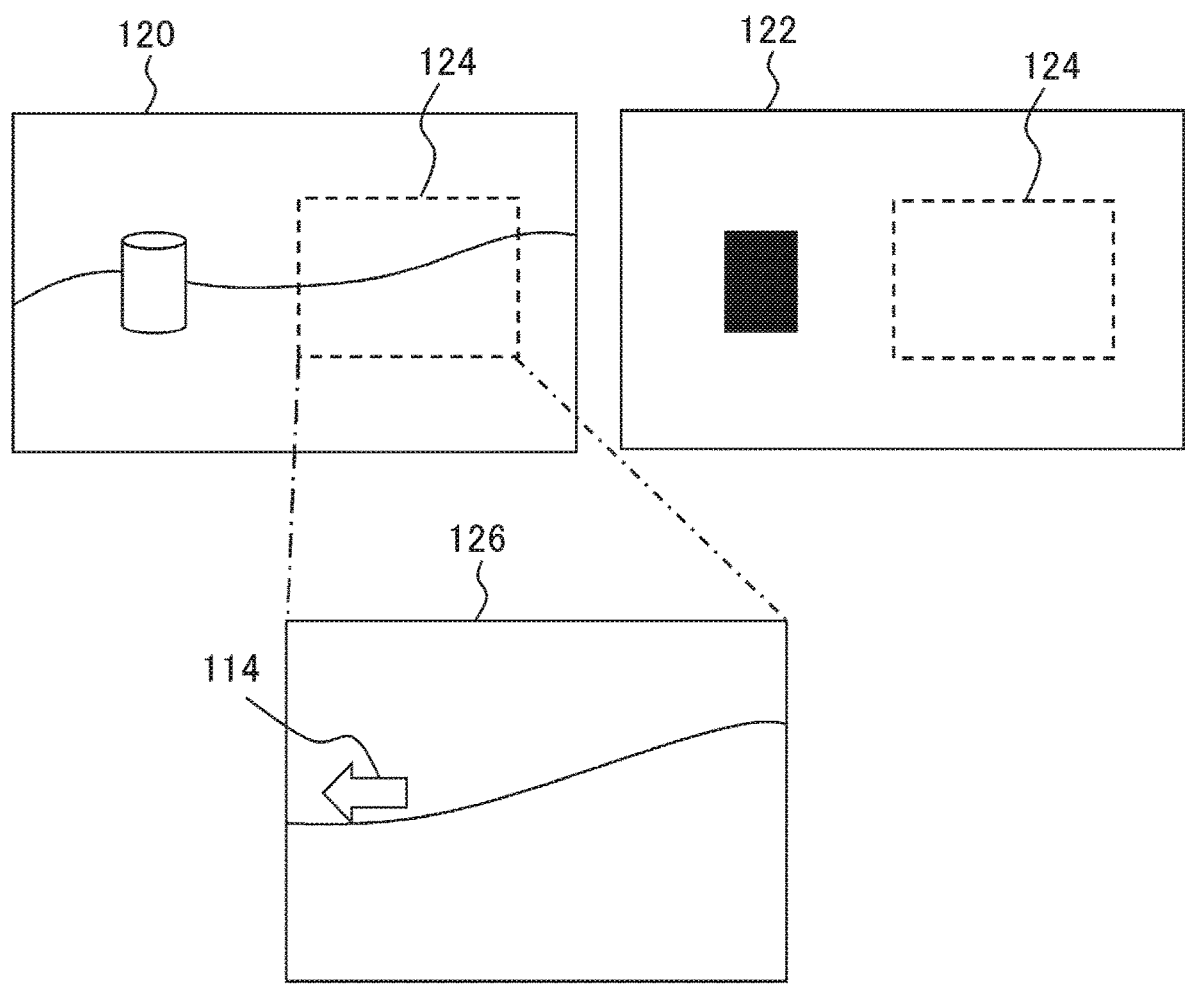
FIG. 7 is an explanatory diagram of an aspect of suggesting the direction in which a subject displayed before switching exists when data on an original picture for use in display is switched, according to the present embodiment.

FIG. 7 is an explanatory diagram of an embodiment in which, when data on an original picture for use in display is switched, a direction in which a subject displayed before the switching is present is indicated. Similarly to the original picture 105 in FIG. 6, an original picture 120 represents an original picture which is used after switching. In this embodiment, the display-picture generation section 76 of the content reproduction device 20 does not directly display a region including a tagged position in tag data 122, a picture of a region 124 which is in the same azimuth as that before switching is displayed also after the switching, for example. In this example, a subject image provided with a tag is outside the visual field, and thus, is not displayed, as depicted in a display picture 126 on the lower side.

Here, the display-picture generation section 76 detects that a tagged position included in the display region before switching is not included in the display region 124 after switching, by referring to tag data 122 that is associated with the original picture 120. In this case, the display-picture generation section 76 superimposes, on the display picture 126, display of an arrow 114 that indicates the direction of the tagged subject with respect to the current display region 124.

Accordingly, if a content viewer wants to continuously view the subject that the content viewer has viewed before switching, the content viewer can easily obtain the desired visual field by changing the visual line toward the direction of the arrow 114 via the input device 14*b*. It is to be noted that the direction of the arrow 114 to be displayed does not necessarily match the direction from the region 124 toward the subject in the original picture 120, and thus, is decided, as appropriate, according to a positional relation between the photograph viewpoint and the subject in the photograph space.

Figure 8:
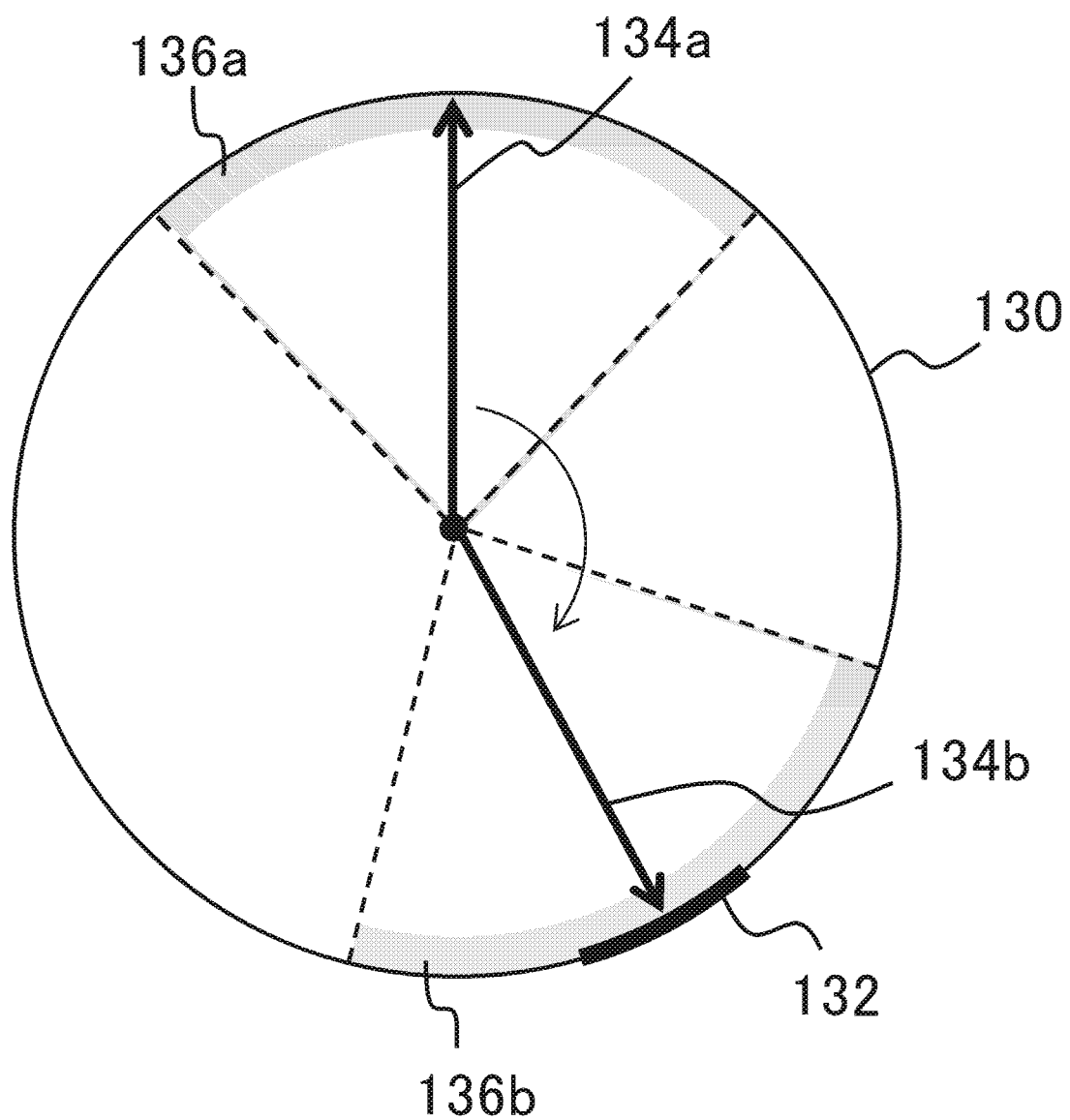
FIG. 8 is an explanatory diagram of an aspect in which the content reproduction device changes a display-time visual line with respect to one original picture by using tag data according to the present embodiment.

In the embodiment explained so far, when an original picture is switched according to movement of a visual line, a subject that is displayed before the switching is displayed even after the switching. However, tag data may be introduced in order to easily include an important subject image in a visual field in a whole-sky picture, irrespective of original picture switching. This method is also implemented by the content reproduction device 20, in an embodiment in which a content viewer operates a viewpoint and a visual line. FIG. 8 is an explanatory diagram of an embodiment in which the content reproduction device 20 changes a display-time visual line with respect to one original picture by using tag data.

FIG. 8 depicts a state where a whole-sky original picture 130 is seen from a bird's eye view. As in the embodiments previously explained, an equirectangular projection can be adopted as the data format. However, in FIG. 8, an axis of the longitudinal direction is depicted in the circumferential direction. It is assumed that, in the plane of the original picture 130, a region 132 is provided with a tag. The tag is provided in the content creation device 18 by a content creator. The tag is provided to a region, in the original picture, including a main person or object or a region that the content creator particularly wants to display, for example.

On the other hand, in the content reproduction device 20, a picture is displayed with use of the original picture 130. For example, it is assumed that a content viewer displays a visual field 136*a* that corresponds to a visual line 134*a* according to the content viewer's operation. In a case where the main object is not included in the visual field 136a, the content viewer desires to restore the display of the region including the main object. However, in a 360° whole-sky picture, a movable range is too wide to easily restore display in some cases.

To this end, when the content viewer operates specific input means of the input device 14b, display is immediately changed to a visual field including a tagged region. Specifically, when the input means of the display-viewpoint acquisition section 74 is operated, the display-viewpoint acquisition section 74 of the content reproduction device 20 changes the visual line 134a to the visual line 134b so as to obtain a visual field 136b including the tagged region 132, by referring to the tag data. Accordingly, a portion, of a wide picture, that the content creator wants to display, that is, a portion that the content viewer wants to view can be easily preferentially displayed.

One original picture is depicted in FIG. 8, but similar tag data can be associated with all the original pictures for use in display, as in the aforementioned examples, and thus, whichever original picture is used, the main portion can be easily displayed. It is to be noted that FIG. 8 depicts the state in which the display viewpoint matches the photograph viewpoint which is at the center of the original picture 130. However, the same applies to a state in which the display viewpoint is displaced from the photograph viewpoint. That is, a visual line vector from the display viewpoint to the tagged region 132 can be easily derived on the basis of the amount of displacement from the photograph viewpoint and the direction of the displacement. Also, in a case where an original picture is a video, tag data is changed according to a shift of the main portion, as a matter of course. Accordingly, when not the visual field is changed, but a main subject goes outside the visual field, for example, the display can follow the subject.

In addition, in a case where content is a mixture of a picture and a sound, a tag is provided, simultaneously with occurrence of a sound, to a subject that is the occurrence source of the sound. Accordingly, the visual line can be directed toward the direction of the sound, irrespective of the direction of the displayed visual field. As a result, a desire to confirm the occurrence source of the sound can be satisfied without any stress. In either case, since a content viewer starts to move the visual line on the condition that the content viewer has a desire to move the visual line so that motion sickness, which is likely to be induced by an automatic visual field change in a head mounted display, is unlikely induced. The embodiment depicted in FIG. 8 may be combined with the visual line control in original picture switching or may be independently introduced. In the former case, common tag data may be used, or separate tag data may be independently generated.

FIGS. 9 and 10 are explanatory diagrams of methods of using tag data in content for depicting an actual site at a point on a map by using a photographed picture. First, FIG. 9 schematically depicts a general content operation method and a display transition of the content. A display screen 140a displays a picture actually photographed at a previously designated site on a map. In this example, a geometrical FIG. 148a that represents a designated current position and a photographed picture including a road and a building 146 that can be seen from the current position are displayed.

This picture actually displays a partial region 154a of an original picture 142a, which is a whole-sky picture, as indicated by a dotted line. A visual line for deciding the region 154a can be changed by use of the input device 14b. The left side in FIG. 9 indicates a state where the positional relation between a photograph viewpoint 152a of the original picture 142a or the like and the building 146 is seen from a bird's eye view. It is assumed that the viewpoint of a picture being displayed in the display screen 140a matches the photograph viewpoint 152a. That is, the building 146 is included on the right front side of a visual field that corresponds to the visual line in the direction of an arrow A from the photograph viewpoint 152a.

The display screen 140a further displays an arrow 150 for designating a movement direction. To confirm the building 146 located on the front side, the content viewer directs and determines the arrow 150 by using a cursor or the like through the input device 14b so that the viewpoint can be moved forward. However, as a result of this operation, the viewpoint is frequently moved too far, as depicted in a display screen 140b, so that the building 146 which is the target goes outside the visual field.

That is, when the viewpoint is moved toward the direction of the arrow A, the display is switched to display using a next original picture 142b photographed from a photograph viewpoint 152b. In a case where any tag data is not used, the direction of the visual line remains in the direction of the arrow A which indicates the advance direction, and thus, the building 146 is not included in a corresponding visual field region 154b in the original picture 142b. In this case, the content viewer has to find out the building 146 by changing the direction of the visual line. In addition, when the building 146 suddenly disappears from the display, the content viewer cannot intuitively get to understand which location is being displayed, and may feel stress.

Therefore, in map content involving display of actually photographed pictures, a landmark such as a building is often considered to be more important than following a road. FIG. 10 schematically depicts a display transition when a landmark is provided with a tag to control a visual line. On a display screen 160a, a photographed picture when the direction of the visual line is determined as the direction of an arrow A from the photograph viewpoint 152a is displayed, as on the display screen 140a in FIG. 9. The building 146 is displayed on the right front side.

On the other hand, in each of the original pictures 142a and 142b photographed from the photograph viewpoints 152a and 152b, a tag is provided to the region of an image of an object which is a landmark such as the building 146, and tag data 162a and 162b indicating the tag position is associated with the tag. The target of the tag is not limited to any particular type as long as the target is an object, such as a building, a scenic spot, or a large street intersection, that the viewer is highly likely to set as a target. As previously explained, in the picture data output device 10 or the content creation device 18, the tag is provided on the basis of automatic detection of an image or designation made by a content creator.

In a case where a tagged position is included in the region 154a being displayed, the display-viewpoint acquisition section 74 of the content reproduction device 20 allows the content viewer to select the position. For example, display of an arrow 164 indicating the building 146 provided with a tag is superimposed on the display screen 160a depicted in FIG. 10. In this case, when the content viewer points and determines the arrow 164 by a cursor or the like through the input device 14b, the display-picture generation section 76 moves the viewpoint toward the direction of the arrow A, if needed, as in the case of FIG. 9. At the same time, the visual line is controlled to be directed toward the building 146, as depicted on the left side in FIG. 10.

Specifically, the display-picture generation section 76 switches the display target to the original picture 142b photographed from the next photograph viewpoint 152b in the advance direction, and then, decides the visual line by referring to tag data 162b such that the region 154b including the tagged position is displayed. Accordingly, a picture including the building 146 that is viewed from the moved viewpoint is displayed, as displayed in the display screen 160b.

During the transition from the display screen 160a to the display screen 160b, the same building 146 is kept displayed. Therefore, a location being displayed can be intuitively discerned, and further, the target building 146 can be checked in more detail. It is to be noted that the method for selecting a landmark is not limited to that depicted in the drawing. For example, when a cursor which is moved by a viewer overlaps a landmark provided with a tag, the color of the landmark may be changed to indicate that the landmark is selectable.

Also in the present embodiment, once a picture, such as the display screen 140b in FIG. 9, in which the building 146 is not included may be displayed, and then, display of a geometrical figure such as an arrow indicating a direction in which the building 146 is located may be superimposed on the picture in the similar manner to that in FIG. 7. With the geometrical figure such as an arrow, an image of the building 146 that is located in the direction indicated by the arrow may be clipped so that display of the clipped image is superimposed. In this case, when the content viewer changes the visual line to the direction indicated by the arrow through the input device 14b, a visual field including the building 146, that is, the display screen 160b can be easily displayed. Also in this case, the target building 146 can be confirmed with little labor and time while the building 146 and the current position are not missed.

In addition, in map content, positional information regarding a photograph viewpoint and map information can be combined to identify a direction in which the position of a tagged target is located with respect to the photograph viewpoints. In a case where this technology is used, even after switching to an original picture in which a landmark such as the building 146 designated by a content viewer is not included is performed, a movement direction for displaying an original picture including the landmark can be indicated.

In the example in FIG. 10, for example, even if the photograph viewpoint 152b is not present in the advance direction and the building 146 cannot be seen from the next photograph viewpoint (e.g. photograph viewpoint 152c), the direction of the building 146 can be indicated by an arrow or the visual line can be directed to the direction in the display using the corresponding original picture. Accordingly, the viewer can bring the viewpoint closer to the building 146. After a while, a close-up image of the building 146 can be represented by use of an original picture photographed from a photograph viewpoint (e.g. photograph viewpoint 152d) from which the building 146 can be seen.

Figure 11:
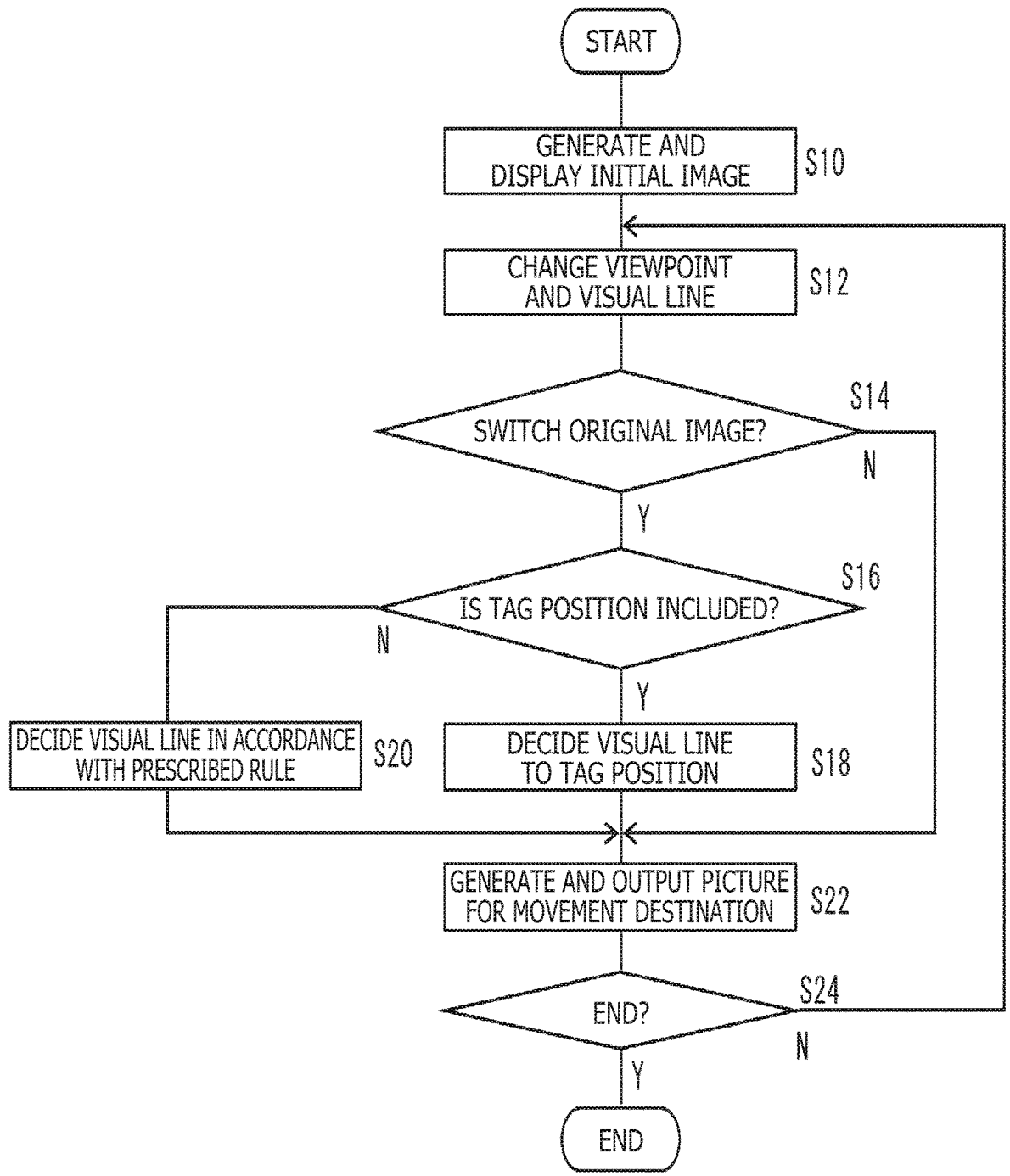
FIG. 11 is a flowchart depicting process procedures in which the content reproduction device according to the present embodiment generates a display picture by using a plurality of whole-sky pictures while using tag data.

Next, operation of the content reproduction device 20 that can be implemented by the aforementioned configurations will be explained. FIG. 11 is a flowchart depicting process procedures in which the content reproduction device 20 according to the present embodiment generates a display picture from a plurality of whole-sky pictures while using tag data. This flowchart is started in a state where a plurality of original pictures, data on tags associated with the respective original pictures, and data indicating positional information regarding the photograph viewpoints, are stored in the data storage section 72. In addition, it is assumed that content in which display is performed while switching among original pictures is performed according to a content viewer's operation, is created.

First, the display-picture generation section 76 selects any one of original pictures in the data storage section 72, and generates and displays an initial picture (S10). An original picture, a viewpoint, and a visual line which are used in this step are previously set for the content. Alternatively, a map may be displayed in advance, a content viewer may designate a point thereon, and the original picture, the viewpoint, and the visual line may be determined on the basis of the designated point. Next, the display-viewpoint acquisition section 74 changes the viewpoint and the visual line according to a content viewer's operation (S12). As previously explained, the viewpoint and the visual line may be directly operated by the content viewer or may be changed as a result of information processing in an electronic game or the like.

Next, the display-picture generation section 76 confirms whether or not original picture switching is necessary because a photograph viewpoint that is different from that of the original picture used so far becomes optimum (S14). When original picture switching is not necessary (N at S14), the display-picture generation section 76 does not perform original picture switching but generates a picture of a region located in the direction of the visual line, and outputs the picture to the display device 16b (S22). When original picture switching is necessary (Y at S14), the display-picture generation section 76 confirms whether or not a tagged position is included in the previously displayed region, by referring to tag data associated with the original picture before the switching (S16).

In a case where the tagged position is included in the visual field (Y at S16), the display-picture generation section 76 identifies a position at which a tag for the same subject is provided, by referring to tag data associated with the switched original picture. Then, the display-picture generation section 76 decides the visual line such that the visual field includes the position (S18). In a case where a tagged position is not included in the visual field before the switching (N at S16), the visual line is decided in accordance with a predetermined rule. For example, the direction of the visual line before the switching is kept. After deciding the visual line in 51 or S20, the display-picture generation section 76 generates a picture of a region located in the direction of the visual line by using the switched original picture, and outputs the generated picture to the display device 16b (S22).

When there is no necessity (e.g. a request to stop content viewing from the content viewer) to end the process, S12 to S22 are repeated. When there is a necessity to end the process, the process is stopped (Y at S24). Accordingly, picture display using a plurality of original pictures can be realized while an image which is displayed is maintained, if needed, in a visual field corresponding to a content viewer's operation. It is to be noted that S18 may be executed by an operation performed on predetermined input means, as depicted in FIG. 8, but an explanation of such a case is omitted in this flowchart.

According to the present embodiment explained so far, a technology of using, as display targets, original pictures, such as whole-sky pictures, photographed from a plurality of viewpoints, and switching an original picture for use in display, thereby displaying a picture from various viewpoints, is provided in such a way that tag data indicating the position at which a subject is to be displayed is prepared to be associated with each of the original pictures. Then, a visual line is controlled such that, in a case where a tagged position is included in a visual field before original picture switching, a position indicated by a tag for the same subject is continuously included in the visual field after the switching. Consequently, a main subject can be continuously displayed before and after original picture switching.

As a result, a viewer can be prevented from missing a point to see or missing the position of the viewer in the picture space when an original picture is switched. In addition, labor and time to search a wide picture space in order to catch a target that the viewer was viewing before the switching, can be saved. Not only when original picture switching is performed, but also when a content viewer operates predetermined input means, the visual field is moved to a tagged position so that the visual line can be easily directed toward a main subject. Consequently, while a whole-sky picture is used to give a high degree of freedom to a viewpoint or a visual line, the visual line is properly controlled at a necessary timing, whereby display of a picture can be continued in a preferable visual field as a whole.

The present invention has been explained so far on the basis of the embodiments. The above embodiments exemplify the present invention. A person skilled in the art will understand that various modifications can be made to a combination of the components and the processing processes, and that these modifications are also within the scope of the present invention.

REFERENCE SIGNS LIST

1 Content processing system, 10 Picture data output device, 12 Picture capturing device, 14*a* Input device, 16*a* Display device, 18 Content creation device, 20 Content reproduction device, 23 CPU, 24 GPU, 26 Main memory, 32 Communication section, 34 Storage section, 36 Output section, 38 Input section, 40 Recording-medium driving section, 50 Original picture acquisition section, 52 Tag data generation section, 54 Data output section, 60 Data acquisition section, 62 Data storage section, 64 Content generation section, 66 Data output section, 70 Data acquisition section, 72 Data storage section, 74 Display-viewpoint acquisition section, 76 Display-picture generation section, 78 Data output section.

INDUSTRIAL APPLICABILITY

As explained so far, the present invention can be used for various devices including game devices, image processing device, picture data output devices, content creation devices, content reproduction devices, picture capturing devices, and head mounted displays, and for systems including such devices.

The invention claimed is:

1. A content reproduction device comprising:
a data acquisition section that acquires data on an original whole-sky picture for use in display, and tag data indicating a position of one or more subjects in the original picture;
a display-viewpoint acquisition section that acquires a display-time viewpoint and a display-time visual line with respect to the original picture;
a display-picture generation section that generates, from the original picture, a display picture in a visual field based on the display-time viewpoint and the display-time visual line and switches the original picture to reflect a new display-time viewpoint and display-time visual line; and
a data output section that outputs data on the display picture to a display device,
wherein, in a case where any of the subjects indicated by tag data is included in the displayed visual field immediately before original picture switching, the display-picture generation section performs processing for including the subject in the visual field of the switched original picture by referring to the tag data.

2. The content reproduction device according to claim 1, wherein
the data acquisition section acquires a plurality of original pictures obtained by full-azimuth photographing from different viewpoints, and positional information regarding viewpoints when the photographing is performed, and,
when switching the original picture for use in the display according to a change of the display-time viewpoint, the display-picture generation section changes the display by controlling the post-switching visual line such that the position indicated by the tag for a same subject is included within the visual field before and after the switching.

3. The content reproduction device according to claim 1, wherein the display-picture generation section changes the display by controlling the visual line such that the position indicated by the tag is included within the visual field when the viewer operates predetermined input means.

4. The content reproduction device according to claim 1, wherein
the data acquisition section acquires a plurality of original pictures obtained by full-azimuth photographing from different viewpoints, and positional information regarding viewpoints when the photographing is performed, and,
when switching the original picture for use in display according to a change of the display-time viewpoint, the display-picture generation section displays a geometrical figure to indicate, in the switched original picture, a relative direction of the position indicated by the tag for a same subject that is included within the visual field before the switching.

5. The content reproduction device according to claim 1, wherein the data acquisition section acquires the original picture data which is a whole-sky video including a plurality of frames, and the tag data associated with the respective frames.

6. A picture data output device that outputs data on an original whole-sky picture for use in display, the picture data output device comprising:
an original picture acquisition section that acquires, as data on the original picture, a video including a plurality of frames obtained by full-azimuth photographing from different viewpoints;
a tag data generation section that generates tag data for display control, the tag data indicating a position of one or more subjects in each of the frames; and
a data output section that outputs data on the original picture and the tag data in association with each other,
wherein in a case where any of the subjects indicated by tag data is included in a displayed visual field immediately before the original picture is switched to reflect a changed viewpoint and visual line, the subject is included in the visual field of the switched original picture by referring to the tag data.

7. A content creation device comprising:
a data acquisition section that acquires data on a plurality of original pictures obtained by full-azimuth photographing from different viewpoints, and data on tags indicating positions of one or more subjects in the respective original pictures;
a content generation section that generates video data using the original pictures by setting data on an original picture for use in display, a timing of switching the original picture, and a visual field to be displayed, with respect to a time axis of the display; and
a data output section that outputs the video data,
wherein the content generation section controls a post-switching visual field at the timing of switching the original picture such that the position indicated by the tag for a same subject is included within the visual field before and after switching.

8. A content reproduction method by a content reproduction device, comprising:
acquiring data on an original whole-sky picture for use in display, and tag data indicating a position of one or more subjects in the original picture;
acquiring a display-time viewpoint and a display-time visual line with respect to the original picture;
generating, from the original picture, a display picture in a visual field based on the display-time viewpoint and the display-time visual line and switches the original picture to reflect a new display-time viewpoint and display-time visual line; and
outputting data on the display picture to a display device,
wherein the generating the display picture involves performing, in a case where any of the subjects indicated by tag data is included in the displayed visual field immediately before original picture switching, processing for including the subject in the visual field after the original picture switching by referring to the tag data.

9. A picture data output method by a picture data output device that outputs data on an original whole-sky picture for use in display, the picture data output method comprising:
acquiring, as data on the original picture, a video including a plurality of frames obtained by full-azimuth photographing from different viewpoints;
generating tag data for display control, tag data indicating a position of one or more subjects in each of the frames; and
outputting data on the original picture and the tag data in association with each other,
wherein in a case where any of the subjects indicated by tag data is included in a displayed visual field immediately before the original picture is switched to reflect a changed viewpoint and visual line, the subject is included in the visual field of the switched original picture by referring to the tag data.

10. A content creation method by a content creation device, comprising:
acquiring data on a plurality of original pictures obtained by full-azimuth photographing from different viewpoints, and data on tags indicating positions of a particular subject in the respective original pictures;
generating video data using the original pictures by setting data on an original picture for use in display, a timing of switching the original picture, and a visual field to be displayed, with respect to a time axis of the display; and
outputting the video data,
wherein the generating the video data involves controlling a post-switching visual field at the timing of switching the original picture such that the position indicated by the tag for a same subject is included within the visual field before and after the switching.

11. A non-transitory, computer readable storage medium containing a computer program, which when executed by a computer, causes the computer to carry out actions, comprising:
acquiring data on an original whole-sky picture for use in display and tag data indicating a position of a particular subject in the original picture;
acquiring a display-time viewpoint and a display-time visual line with respect to the original picture;
generating, from the original picture, a display picture in a visual field based on the display-time viewpoint and the display-time visual line and switching the original picture to reflect a new display-time viewpoint and display-time visual line; and
outputting data on the display picture to a display device,
wherein generating the display picture involves performing, in a case where any of the subjects indicated by tag data is included in the displayed visual field immediately before original picture switching, processing for including the subject in the visual field after the original picture switching by referring to the tag data.

12. A non-transitory, computer readable storage medium containing a computer program, which when executed by a computer, causes the computer to carry out actions, comprising:
acquiring, as data on the original picture, a video including a plurality of frames obtained by full-azimuth photographing from different viewpoints;
generating tag data for display control, the tag data indicating a position of a particular subject in each of the frames; and
outputting data on the original picture and the tag data in association with each other,
wherein in a case where any of the subjects indicated by tag data is included in a displayed visual field immediately before the original picture is switched to reflect a changed viewpoint and visual line, the subject is included in the visual field of the switched original picture by referring to the tag data.

13. A non-transitory, computer readable storage medium containing a computer program, which when executed by a computer, causes the computer to carry out actions, comprising:
acquiring data on a plurality of original pictures obtained by full-azimuth photographing from different viewpoints and data on tags indicating positions of a particular subject in the respective original pictures;
generating video data using the original pictures by setting data on an original picture for use in display, a timing of switching the original picture, and a visual filed to be displayed, with respect to a time axis of the display; and
outputting the video data,
wherein the generating video data involves controlling a post-switching visual field at the timing of switching the original picture such that the position indicated by the tag for a same subject is included within the visual field before and after the switching.

14. The content reproduction device according to claim 5, wherein
the display-viewpoint acquisition section switches the original picture for use in display to an original picture photographed from a different viewpoint, according to movement of the subject corresponding to the tag, and the display-picture generation section controls the visual line such that a position of the subject indicated by the tag at a time point of the switching is included in the visual field of the switched original picture.

\* \* \* \* \*